United States Patent
Jin et al.

(10) Patent No.: US 11,563,258 B2
(45) Date of Patent: *Jan. 24, 2023

(54) ICB ASSEMBLY, BATTERY MODULE COMPRISING THE SAME AND METHOD FOR FABRICATING THE BATTERY MODULE

(71) Applicant: LG Chem, Ltd., Seoul (KR)

(72) Inventors: Hee-Jun Jin, Daejeon (KR); Dal-Mo Kang, Daejeon (KR); Kyung-Mo Kim, Daejeon (KR); Seung-Joon Kim, Daejeon (KR); Jin-Yong Park, Daejeon (KR); Ho-June Chi, Daejeon (KR)

(73) Assignee: LG Energy Solution, Ltd.

( * ) Notice: Subject to any disclaimer, the term of this patent is extended or adjusted under 35 U.S.C. 154(b) by 64 days.

This patent is subject to a terminal disclaimer.

(21) Appl. No.: 16/958,540

(22) PCT Filed: Sep. 4, 2019

(86) PCT No.: PCT/KR2019/011420
§ 371 (c)(1),
(2) Date: Jun. 26, 2020

(87) PCT Pub. No.: WO2020/055035
PCT Pub. Date: Mar. 19, 2020

(65) Prior Publication Data
US 2021/0066698 A1    Mar. 4, 2021

(30) Foreign Application Priority Data

Sep. 10, 2018 (KR) ........................ 10-2018-0107984

(51) Int. Cl.
*H01M 50/54* (2021.01)
*H01M 50/20* (2021.01)
*H01M 10/04* (2006.01)

(52) U.S. Cl.
CPC ........... *H01M 50/54* (2021.01); *H01M 10/04* (2013.01); *H01M 50/20* (2021.01)

(58) Field of Classification Search
CPC ....... H01M 50/20; H01M 50/54; H01M 10/04
See application file for complete search history.

(56) References Cited

U.S. PATENT DOCUMENTS 9,246,195 B1    1/2016  Ahn et al.
2003/0091896 A1    5/2003  Watanabe et al.
(Continued)

FOREIGN PATENT DOCUMENTS

EP    2996175 A1    3/2016
GB    2535546 A  *  8/2016    .......... H01M 50/502
(Continued)

OTHER PUBLICATIONS

International Search Report for Application No. PCT/KR2019/011420 dated Dec. 27, 2019, 2 pages.
(Continued)

*Primary Examiner* — Matthew T Martin
*Assistant Examiner* — Katharine A Caughron
(74) *Attorney, Agent, or Firm* — Lerner, David, Littenberg, Krumholz & Mentlik, LLP

(57) ABSTRACT

An interconnect board (ICB) assembly suitable for a battery module of horizontal stack structure including unidirectional battery cells stacked with cell leads facing each other includes an ICB frame in which cell leads of unidirectional battery cells are configured to be received such that the unidirectional battery cells having the cell leads at one end are configured to be placed facing each other with the cell leads facing each other, and busbars formed in the ICB frame and configured to be electrically connected to the cell leads, wherein the ICB frame is configured to be connected to another ICB frame with a hinge structure in a lengthwise direction of the ICB frame. A battery module including the ICB assembly and a method for fabricating the battery module are also provided.

17 Claims, 25 Drawing Sheets

(56) References Cited

U.S. PATENT DOCUMENTS

| | | | |
|---|---|---|---|
| 2007/0020516 A1* | 1/2007 | Yoon | H01M 50/20 |
| | | | 429/153 |
| 2012/0276419 A1 | 11/2012 | Park | |
| 2014/0065448 A1 | 3/2014 | Ahn et al. | |
| 2015/0221909 A1 | 8/2015 | Maruoka et al. | |
| 2016/0197332 A1 | 7/2016 | Lee et al. | |
| 2016/0268658 A1 | 9/2016 | Kong et al. | |
| 2017/0187084 A1 | 6/2017 | Park et al. | |
| 2021/0273302 A1* | 9/2021 | Jin | H01M 50/509 |
| 2021/0288385 A1* | 9/2021 | Jin | H01M 50/503 |

FOREIGN PATENT DOCUMENTS

| | | |
|---|---|---|
| JP | 2003151526 A | 5/2003 |
| JP | 2003197166 A | 7/2003 |
| JP | 2013542576 A | 11/2013 |
| JP | 2016541095 A | 12/2016 |
| JP | 2017118019 A | 6/2017 |
| KR | 20120122860 A | 11/2012 |
| KR | 20140032596 A | 3/2014 |
| KR | 20150022468 A | 3/2015 |
| KR | 101520393 B1 | 5/2015 |
| KR | 20160088002 A | 7/2016 |
| KR | 101686583 B1 | 12/2016 |

OTHER PUBLICATIONS

Extended European Search Report including Written Opinion for Application No. 19860046.2 dated Mar. 22, 2021, 12 pages.

\* cited by examiner (a)

(b)

(a)

(b)

(a)

(b)

ICB ASSEMBLY, BATTERY MODULE COMPRISING THE SAME AND METHOD FOR FABRICATING THE BATTERY MODULE

CROSS-REFERENCE TO RELATED APPLICATIONS

The present application is a national phase entry under 35 U.S.C. § 371 of International Application No. PCT/KR2019/011420, filed Sep. 4, 2019, which claims priority to Korean Patent Application No. 10-2018-0107984 filed in the Republic of Korea on Sep. 10, 2018, the disclosures of which are incorporated herein by reference.

TECHNICAL FIELD

The present disclosure relates to a battery module and a method for fabricating the battery module, and more particularly, to a battery module that is easy to assemble and can be expanded by a simple process and a method for fabricating the battery module and a component used to fabricate the battery module.

BACKGROUND ART

Due to their high applicability to various products and electrical properties such as a high energy density, secondary batteries are not only commonly applied to portable devices, but universally applied to Electric Vehicles (EVs) or Hybrid Electric Vehicles (HEVs) that are driven by an electric driving source. Secondary batteries are gaining attention for their advantage of remarkably reducing the use of fossil fuels and not generating by-products from the use of energy, making them a new eco-friendly and energy efficient source of energy.

Currently, commonly used secondary batteries include lithium ion batteries, lithium polymer batteries, nickel cadmium batteries, nickel hydrogen batteries and nickel zinc batteries. In the secondary battery, a battery cell has the working voltage of about 2.5V~4.5V. In case that higher output voltage is required, a plurality of battery cells may be connected in series to form a battery pack. The battery pack may be formed by connecting a plurality of battery cells in parallel according to the charge/discharge capacity required for the battery pack. The number of battery cells included in the battery pack may be variously set based on the output voltage or charge/discharge capacity required, and the battery cells may be stacked by various series/parallel connection combinations. Pouch-type battery cells are commonly used for battery packs of medium- and large-sized devices because they are easy to stack and lightweight. When forming the battery pack including battery cells, generally a battery module is formed by series/parallel connection of battery cells, and other components are added to the battery module.

FIGS. 1 and 2 are diagrams illustrating the conventional battery module of vertical stack structure.

The battery module of FIG. 1 includes plate-shaped bidirectional battery cells 10 having cell leads 12 on two ends. The battery cells 10 are vertically arranged with the cell leads 12 placed on one side and stacked side by side. For example, for series connection of the stacked battery cells 10, the battery cells 10 are stacked in an alternating manner such that the cell leads 12 of the neighboring battery cells 10 are opposite in polarity.

The battery module may use laser welding to electrically connect the battery cells 10. For example, the cell leads 12 are bent on one side of the stacked battery cells 10 and brought into contact with each other, and the bent parts of the cell leads 12 are welded by a laser LB outputted from a laser generator LG. Also on the other side of the stacked battery cells 10, the cell leads 12 are welded for electrical connection.

In this instance, an interconnect board (ICB) assembly 14 as shown in FIG. 2 may be used. FIG. 2 is a schematic perspective view showing part of the conventional battery module of vertical stack structure. For convenience of illustration and description, only part of the ICB assembly 14 is shown.

For example, the ICB assembly 14 is coupled to the cell leads 12 on one side of the battery cells 10 stacked as shown in FIG. 1, and a busbar 18 of the ICB assembly 14 and the cell lead 12 are welded to form a linear welded part P.

The ICB assembly 14 includes an ICB frame 16 and the busbar 18, and the cell lead 12 of the battery cell 10 goes through a connection hole formed in the ICB frame 16 and is disposed on the busbar 18 and welded. The ICB assembly 14 is used to connect the cell leads 12 for electrical connection of the battery cells 10, and transmit an electrical signal corresponding to the temperature of the battery cells 10 and an electrical signal corresponding to the current or voltage of the battery cells 10 to a battery management system (BMS) during repeated charging and discharging of the battery cells 10.

In the battery module of vertical stack structure as described above, when welding the cell lead 12-the busbar 18, welding may be performed on the side of the battery cell 10, and this is a welding direction suitable only for the battery module of vertical stack structure and its fabrication method and ICB assembly 14 are suitable only for the battery module of vertical stack structure. It cannot be used to fabricate, for example, a battery module of horizontal stack structure as shown in FIG. 5 using a unit cell as shown in FIG. 4 including unidirectional battery cells as shown in FIG. 3.

FIG. 3 is a perspective view of the unidirectional battery cell that makes up the unit cell in the general battery module.

The battery cell 110 shown in FIG. 3 is a plate-shaped unidirectional battery cell having cell leads 112 at one end. In detail, the battery cell 110 has a structure in which an electrode assembly 105 is embedded in a pouch-type case 120 of a laminate sheet including a metal layer and a resin layer, and a sealing part SP is formed, for example, by thermal bonding. The cell lead 112 of the positive polarity (+) is connected to a positive electrode plate in the electrode assembly 105, and the cell lead 112 of the negative polarity (−) is connected to a negative electrode plate in the electrode assembly 105.

The unit cell of the battery module may include one battery cell 110, or two or more battery cells 110 connected in series or in parallel. FIG. 4 is a side view of, for example, a 3P bank unit cell including three battery cells 110 connected in parallel.

Referring to FIG. 4, the battery cells 110 lying in the horizontal direction are stacked in the heightwise direction from the ground such that the cell leads 112 of the same polarity are placed in upper and lower positions, and the cell leads 112 placed in upper and lower positions are incorporated. In one unit cell 200, the cell leads 112 are exposed to one side.

FIG. 5 shows an example of the battery module of horizontal stack structure using eight unit cells 200 of FIG. 3.

Referring to FIG. 5, shown is the battery module 250 in which four unit cells 200 are horizontally placed and stacked in the heightwise direction from the ground to form a battery cell assembly 230, and two battery cell assemblies 230 are connected such that the cell leads 112 face each other. There are the following problems when fabricating the module including the unidirectional the battery cells 110 horizontally stacked, facing each other as described above.

Due to the structure of the cell leads 112 facing each other between the two battery cell assemblies 230, it is difficult to weld on the side as shown in FIG. 1 or 2, and it is necessary to weld the unit cells 200 on the top side. For welding on the top side, since it is impossible to form the two battery cell assemblies 230 and then weld them, it is necessary to assemble the unit cells 200 in the heightwise direction from the ground, i.e., from bottom to top, by repeating the stacking and welding process in a sequential order, such as placing two unit cells 200 such that the unit cells 200 face each other, welding the cell leads 112 on the top side (first layer), stacking two unit cells 200 thereon such that the unit cells 200 face each other and welding the cell leads 112 on the top side (second layer), and stacking two unit cells 200 thereon such that the unit cells 200 face each other and welding the cell leads 112 on the top side (third layer). As described above, the battery module 250 of horizontal stack structure is fabricated by a very complex process.

DISCLOSURE

Technical Problem

The present disclosure is designed to solve the above-described problem, and therefore, the present disclosure is directed to providing an interconnect board (ICB) assembly suitable for a battery module of horizontal stack structure including unidirectional battery cells stacked with cell leads facing each other, a battery module comprising the same and a method for fabricating the battery module.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, an interconnect board (ICB) assembly according to the present disclosure includes an ICB frame in which cell leads of unidirectional battery cells are configured to be received such that the unidirectional battery cells having the cell leads at one end are configured to be placed facing each other with the cell leads facing each other; and busbars formed in the ICB frame and configured to be electrically connected to the cell leads, wherein the ICB frame is configured to be connected to another ICB frame with a hinge structure in a lengthwise direction of the ICB frame.

The ICB frame may have rod-shaped protrusions on respective sides thereof, the sides being separated along the lengthwise direction.

The ICB assembly may further include a joint element having grooves into which the protrusions are configured to be inserted, respectively, for connecting two ICB frames arranged along the lengthwise direction.

A method for fabricating a battery module according to the present disclosure may be performed using the ICB assembly according to the present disclosure.

The method for fabricating a battery module according to the present disclosure includes (a) preparing a plurality of interconnect board (ICB) assemblies, each ICB assembly including: an ICB frame in which cell leads of unidirectional battery cells are configured to be received such that the unidirectional battery cells having the cell leads at one end are configured to be placed facing each other with the cell leads facing each other, and busbars formed in the ICB frame and configured to be electrically connected to the cell leads, (b) laterally connecting and arranging the ICB frames of the ICB assemblies in the lengthwise direction of the ICB frames with a hinge structure between adjacent ICB frames, (c) mounting unidirectional battery cells on right and left sides of the lengthwise direction of the laterally connected ICB frames to horizontally arrange the battery cells such that the battery cells face each other, (d) connecting the ICB assemblies to the arranged battery cells by welding the busbars and the cell leads together on a top side, (e) stacking the battery cells by folding the arranged ICB frames at the hinge parts, and (f) coupling an additional busbar between the busbars of the ICB assemblies exposed to a side.

In this instance, at least one of the battery cells preferably includes bank unit cells stacked such that cell leads within the bank unit cells of same polarity are in contact with each other and connected in parallel.

After the steps (c) and (d) are performed, the ICB assemblies and the battery cells connected to each other may be reversed so that lower surfaces of the ICB frames are placed upward, and the method may further include connecting the ICB assemblies to the arranged battery cells by welding the busbars and the cell leads together on the lower surfaces of the ICB frames.

The (c) step may include mounting the cell leads on the busbars to horizontally arrange the battery cells.

The step (e) may include stacking the battery cells in a hinged manner.

A battery module according to the present disclosure may include the ICB assembly according to the present disclosure.

The battery module according to the present disclosure includes units of battery cell—interconnect board (ICB) assembly—battery cell stacked in a heightwise direction from a ground, wherein in each unit, unidirectional battery cells having cell leads at one end are connected facing each other with respect to an ICB assembly such that the cell leads face each other, wherein each ICB assembly includes an ICB frame in which the cell leads are received, and busbars formed in the ICB frame and electrically connected to the cell leads, wherein adjacent ICB assemblies of the stacked ICB assemblies are connected with a joint element, and wherein the battery module further comprises an additional busbar for vertical series connection of the battery cells coupled to a side of the stacked ICB assemblies.

At least one of the battery cells preferably includes bank unit cells stacked such that cell leads within the bank unit cells of same polarity are in contact with each other and connected in parallel.

Two battery cells facing each other in one of the units may be horizontally connected in series through the busbars formed in the respective ICB assembly.

The battery cells in one of the units may include four battery cells connected to the respective ICB assembly, and two of the battery cells placed in upper and lower positions may be vertically connected in series through the busbars formed in the respective ICB assembly.

The joint element is preferably a hinge structure.

Advantageous Effects

According to the present disclosure, there are provided an interconnect board (ICB) assembly suitable for a battery module in which unidirectional battery cells having cell leads at one end are horizontally stacked such that the cell leads face each other, and a method for fabricating a battery module using the same.

The ICB assembly of the present disclosure is used to stack the unidirectional battery cells having the cell leads at one end such that the cell leads face each other. Accordingly, the ICB assembly of the present disclosure is convenient for fabrication of the battery module in which the unidirectional battery cells are horizontally stacked, facing each other. The ICB assembly of the present disclosure is different from the ICB assembly used in the conventional battery module of vertical stack structure. Particularly, the ICB assembly allows side connection to other ICB assembly.

According to the present disclosure, it is possible to simplify the battery module fabrication process by simultaneously welding the battery cells and folding and stacking them. Particularly, according to the method for fabricating a battery module of the present disclosure, it is possible to greatly simplify the steps of the fabrication process of the battery module in which the unidirectional battery cells are horizontally stacked, facing each other.

Conventionally, the battery module of horizontal stack structure is fabricated by repeating the steps of stacking battery cells and welding cell leads many times in a sequential order, while according to the method for fabricating a battery module of the present disclosure, it is possible to weld battery cells all at once and fold and stack them all at once, so it is very suitable for mass production. Additionally, according to the present disclosure, the welding of cell leads-busbars and bonding of a sensing wire may be completed all at once before stacking the battery cells.

Since the battery module of the present disclosure includes the ICB assembly of the present disclosure, it is very easy to assemble. Additionally, it is possible to expand the battery module by increasing the number of battery cells connected in series through a simple process of adding the unit of battery cell—ICB assembly—battery cell.

According to the present disclosure, among a large number of possible electrical connection relationships between the battery cells that make up the battery module, the easiest and simplest connection may be provided. A hinge structure may be applied as a stack guide for stacking the battery cells, and an electrical connection between the ICB assemblies may be achieved by coupling an additional busbar to the side of the ICB frame.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR DISCLOSURE

Figure 1:
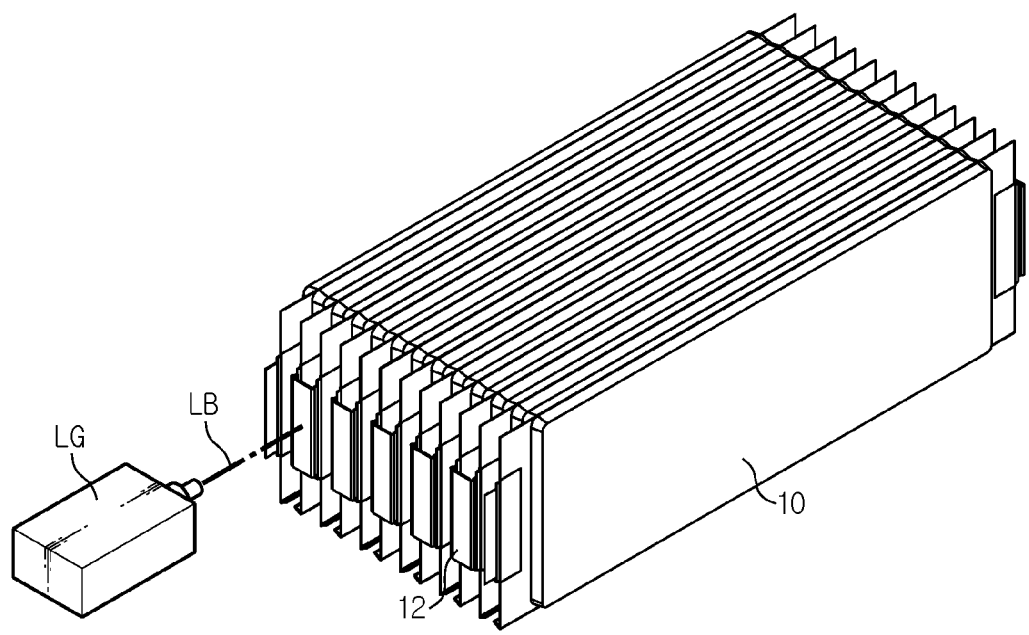
FIGS. 1 and 2 are diagrams illustrating the conventional battery module of vertical stack structure.
Figure 2:
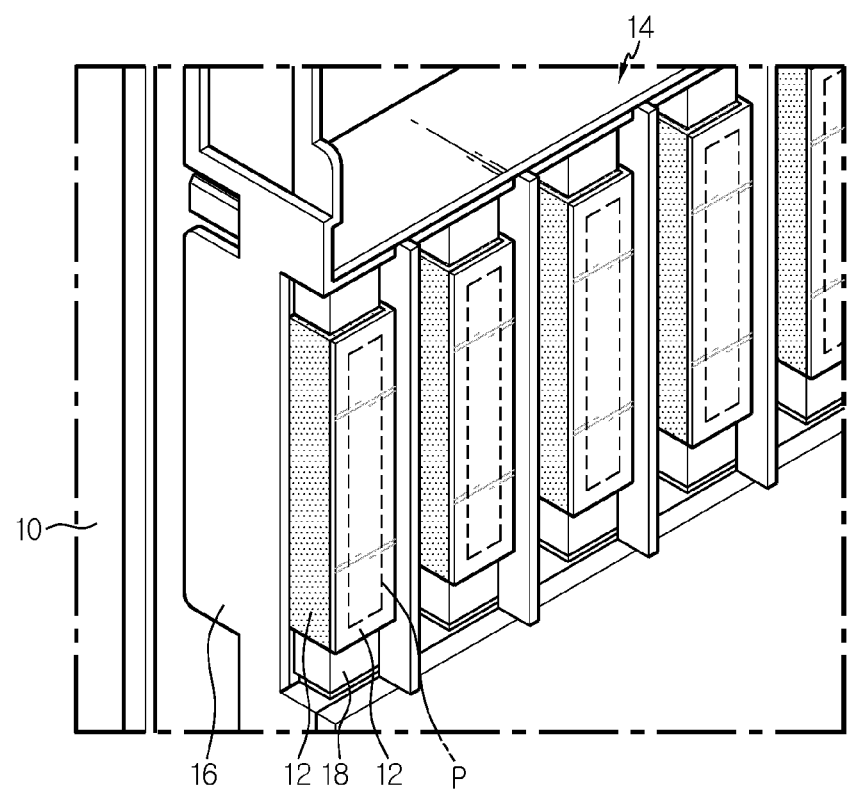

Hereinafter, the preferred embodiments of the present disclosure will be described in detail with reference to the accompanying drawings. However, the embodiments according to the present disclosure may be modified in other different forms, and the scope of the present disclosure should not be construed as limited to the following embodiments. The embodiments of the present disclosure are provided to help those having ordinary skill in the art to understand the present disclosure fully and completely.

It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

Figure 6:
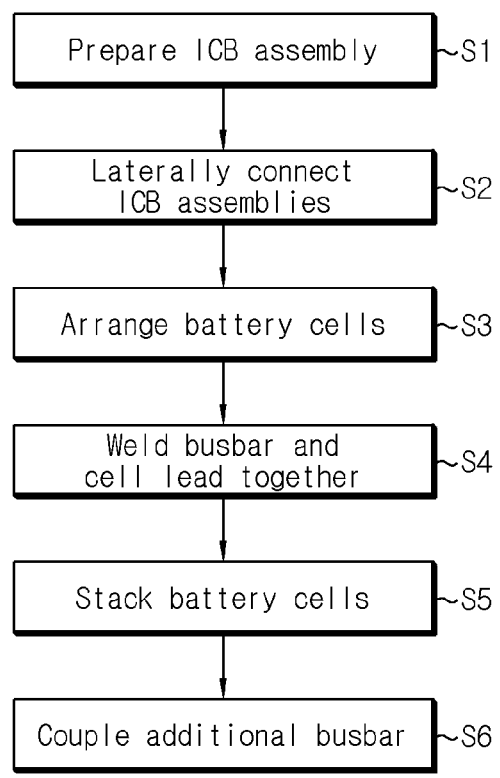
FIG. 6 is a flowchart of a method for fabricating a battery module according to an embodiment of the present disclosure.

FIG. 6 is a flowchart of a method for fabricating a battery module according to an embodiment of the present disclosure, and FIGS. 7 to 12 are diagrams illustrating a battery module according to an embodiment of the present disclosure and each step of a method for fabricating the battery module.

First, an embodiment of the present disclosure will be described with reference to FIGS. 6 to 12.

Figure 7:
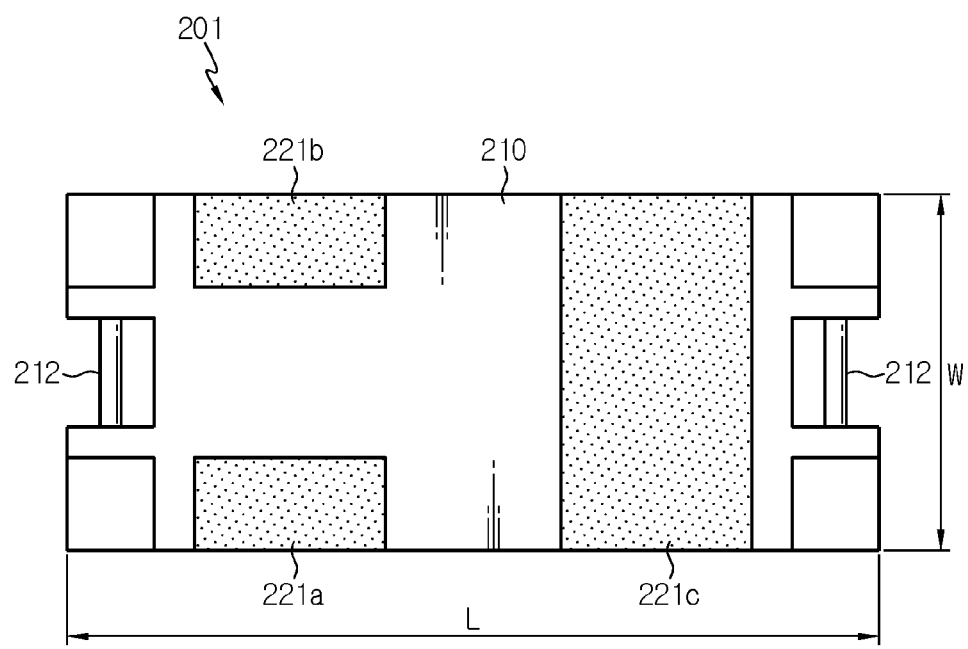
FIGS. 7 to 12 are diagrams illustrating a battery module according to an embodiment of the present disclosure and each step of a method for fabricating the battery module.

According to S1 of FIG. 6 and FIG. 7, an interconnect board (ICB) assembly is prepared (S1).

FIG. 7 is a top view of the ICB assembly taken as an example. As shown in FIG. 7, the ICB assembly 201 includes an ICB frame 210 and busbars 221a, 221b, 221c.

The ICB frame 210 may be provided between unidirectional battery cells (in this embodiment, the battery cells 110 of FIG. 3) such that cell leads face each other. The ICB frame is a plate-shaped structure having a length L and a width W, and the cell leads of the battery cells may be placed on the ICB frame such that the battery cells are placed on two sides, facing each other, with respect to the lengthwise direction center line. Since the unidirectional battery cells are placed on two sides, facing each other, with respect to the ICB frame 210, the ICB frame may be referred to as a 'central' ICB frame.

The busbars 221a, 221b, 221c are formed in the ICB frame 210 and electrically connected to the cell leads of the battery cells. The busbars 221a, 221b, 221c of arbitrary shape and location are shown as an example.

The ICB frame 210 may be formed to which busbars of many shapes may be differently applied. For example, the ICB frame 210 has steps and busbar insertion holes for assembling an arbitrary busbar at an arbitrary location, and the busbars may be a combination of busbars selected from the group consisting of busbars of many shapes that may be assembled into the ICB frame 210 through the steps and the busbar insertion holes, considering an electrical connection relationship between battery cells. In this instance, the ICB assembly 201 may be prepared by inserting and assembling the busbars into the ICB frame 210. The ICB frame 210 may be made of a plastic molding material. The busbars may be detachably assembled into the ICB frame 210.

Instead, the ICB assembly 201 may be manufactured such that the busbars are coupled to the ICB frame 210. The ICB assembly 201 may include the ICB frame 210 integrally formed with the busbars that fit for purpose such as an electrical connection relationship, for example, by insert molding.

In this embodiment, two battery cells may be placed on one ICB frame 210. The busbars 221a, 221b, 221c are formed on the upper surface of the ICB frame 210. The cell leads of the battery cells are mounted on the busbars 221a, 221b, 221c.

Four battery cells may be placed on one ICB frame 210. In this case, the cell leads of the battery cells are placed on the upper surface and the lower surface of the ICB frame 210. For connection between them, for example, the busbars may be placed on both the upper surface and the lower surface of the ICB frame 210.

Particularly, the ICB frame 210 is connected to other ICB frame in the lengthwise L direction with a hinge structure. To this end, the hinge structure may be directly prepared on the side of the ICB frame 210, or the ICB frame 210 may be connected using a joint element. In this embodiment, for example, a rod-shaped protrusion 212 formed on the side of the ICB frame 210 is taken as an example. Accordingly, the joint element may have a groove into which the protrusion 212 is inserted. The protrusion 212 may be formed on the sides of the widthwise W direction. The protrusion 212 may be formed on only one of the two sides.

A minimum of two battery cells may be connected to the ICB assembly 201, facing each other. Multiple ICB assemblies 201 are prepared considering the number of battery cells that make up the battery module.

Subsequently, according to S2 of FIG. 6 and FIG. 8, the ICB assemblies are laterally connected (S2).

Figure 8:
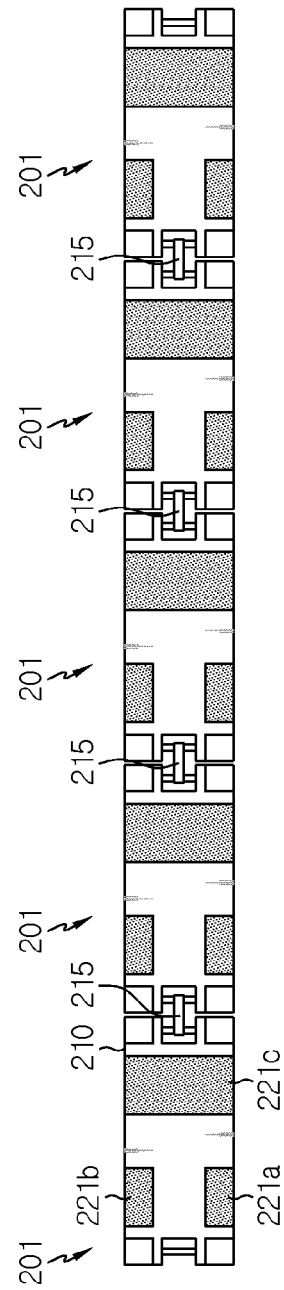

FIG. 8 is a top view of the laterally connected ICB assemblies 201. Here, the ICB assemblies 201 connected to each other may have the same structure as shown, and may have different structures. For example, the detailed shapes of the ICB frames 210 of each ICB assembly 201 may be different from each other. Alternatively, the ICB frames 210 have the same detailed shape but the busbars may have different shapes. The busbars are shaped considering the electrical connection relationship between the battery cells.

The ICB frame 210 is connected to other ICB frame 210 with a hinge structure. In this embodiment, for example, the rod-shaped protrusion 212 formed on the side of the ICB frame 210 is taken as an example. The two ICB frames 210 are connected to each other with the joint element 215 inserted between.

By the side connection, multiple ICB assemblies 201 are arranged in the lengthwise L direction of the ICB frame 210. The two ICB frames 210 may pivot around the joint element 215.

Subsequently, according to S3 of FIG. 6 and FIG. 9, the battery cells are arranged (S3).

Figure 3:
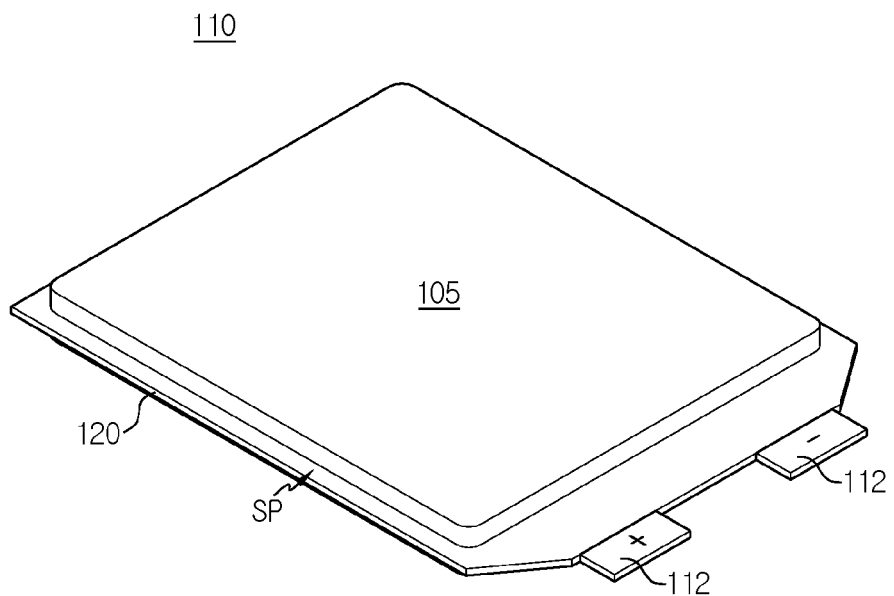
FIG. 3 is a perspective view of a unidirectional battery cell that makes up a unit cell in the conventional battery module.
Figure 9:
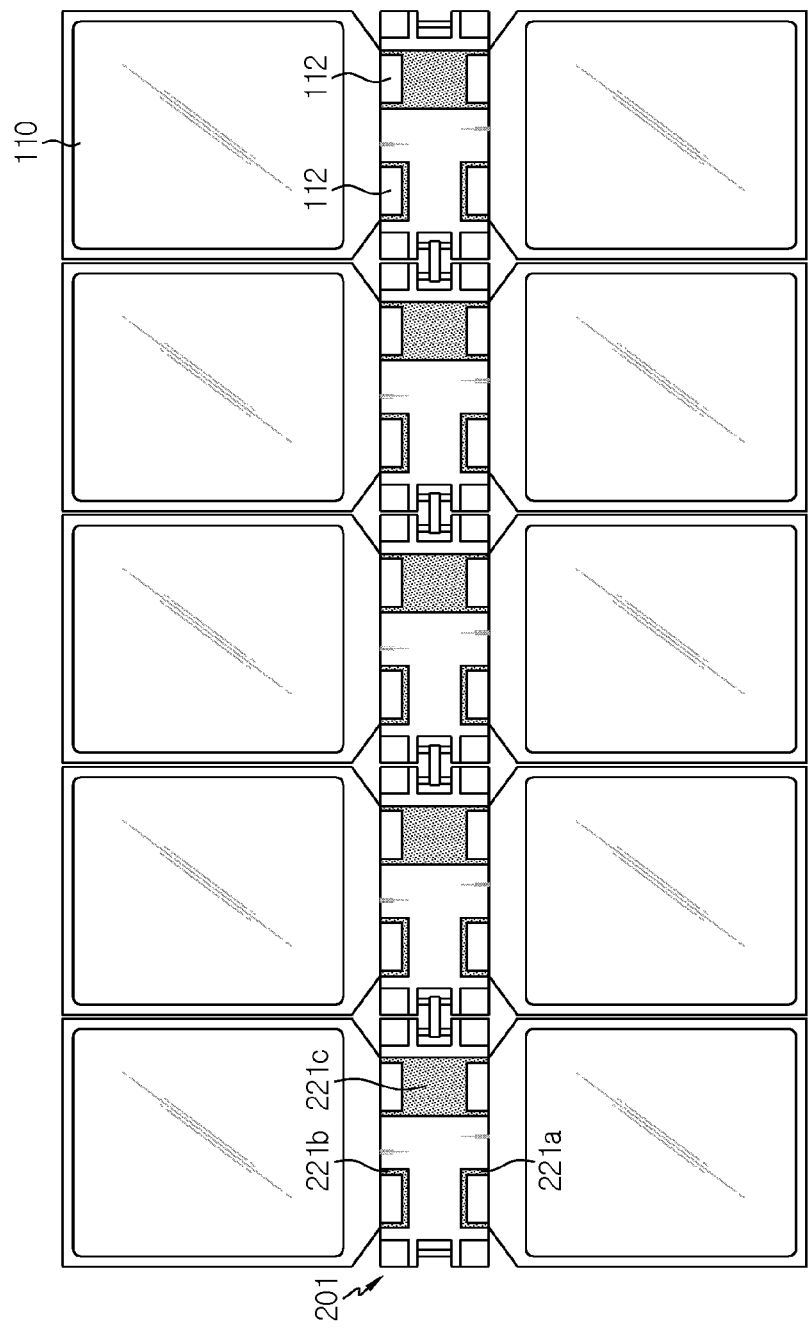

FIG. 9 is a top view of the battery cells 110 as shown in FIG. 3 arranged on the ICB assembly of FIG. 8. The battery cells 110 are horizontally arranged on the left and right sides of the lengthwise direction of the laterally connected ICB frames 210 such that the battery cells 110 face each other. In this instance, the busbars, for example, the battery cell 110 placed on the leftmost ICB assembly 201 is placed such that the cell leads 112 is mounted on the busbars 221a, 221b, 221c. The same is the case with other ICB assembly 201, in which the battery cells 110 are horizontally arranged such that the cell leads 112 of the battery cells 110 are placed on the busbars.

Subsequently, according to S4 of FIG. 6, the busbars and the cell leads 112 are welded together (S4). For the arranged battery cells 110, the busbars and the cell leads 112 disposed in upper and lower positions may be welded together on the top side, and accordingly, the ICB assemblies 201 and the battery cells 110 may be connected.

The subsequent step is the step of stacking the battery cells 110 according to S5 of FIG. 6 (S5). The arranged ICB frames 210 may be folded with respect to the hinge, in this embodiment, the joint element 215. Accordingly, the battery cells 110 arranged and welded as shown in FIG. 9 may be folded and stacked easily all at once. In this instance, the method of FIG. 10 may be used.

Figure 10:
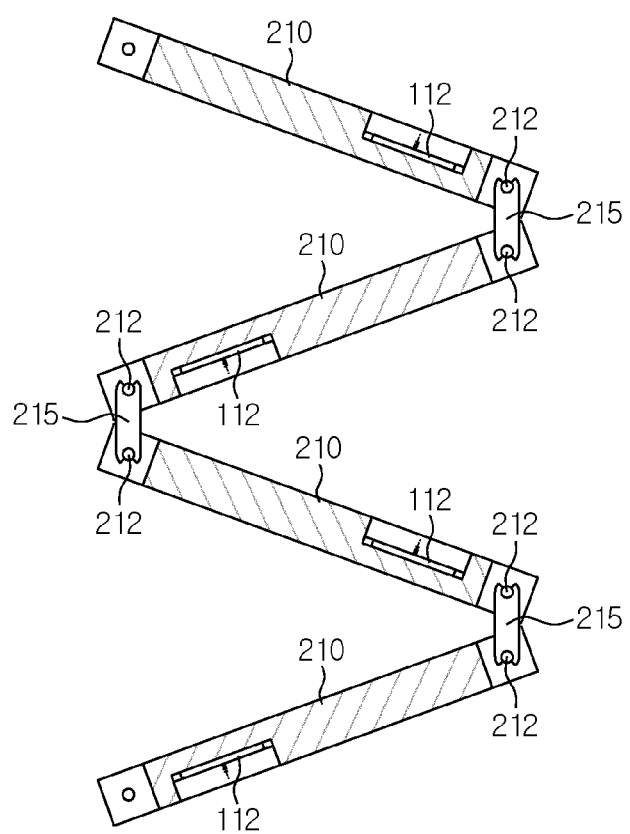

FIG. 10 is a diagram showing the battery cells 110 stacked in a hinged manner, and for convenience of illustration, in FIG. 9, illustration of the battery cell 110 is omitted and only the ICB frame 210 is shown. The ICB frames 210 may be folded in a zigzag fashion with respect to the joint element 215 between two ICB frames 210, and the battery cells 110 connected thereto may be folded and stacked together in a zigzag fashion.

Figure 11:
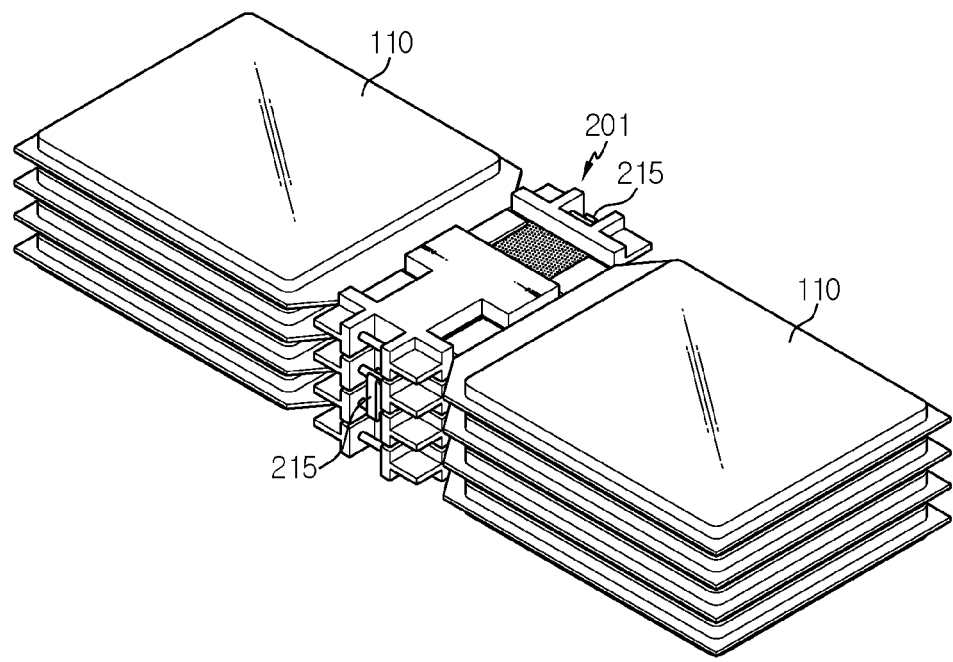

After S5 of FIG. 6 is performed, the battery cells 110 are stacked as shown in FIG. 11.

Figure 12:
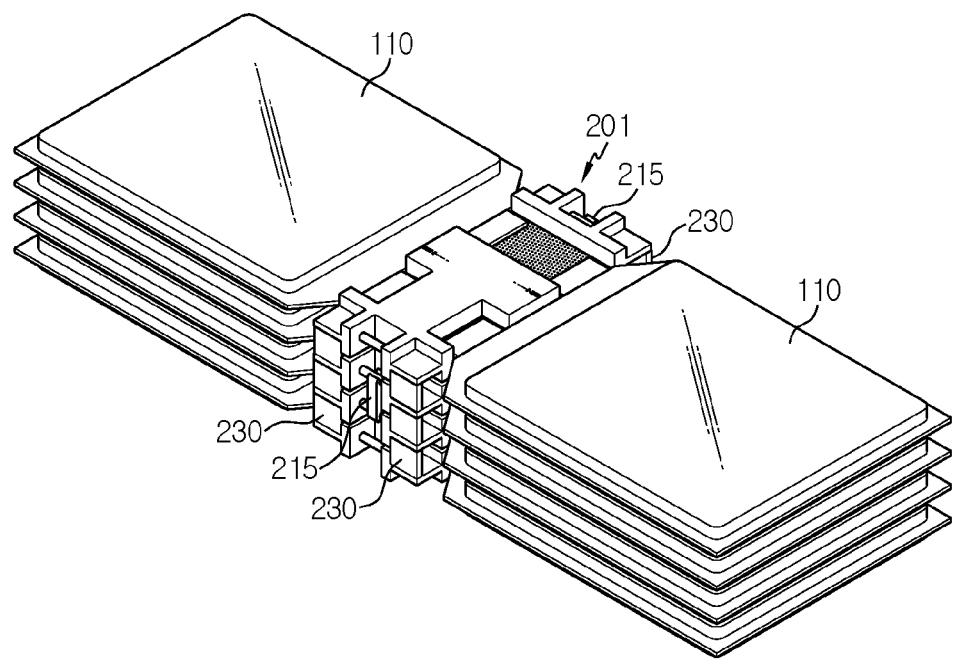

Now, according to S6 of FIG. 6 and FIG. 12, an additional busbar is coupled (S6).

The additional busbar 230 is placed between the busbars exposed to the side of the ICB frame 210, and coupled by welding. The additional busbar 230 may establish a vertical series connection between the battery cells 110 placed in the upper and lower positions. The additional busbar 230 is not limited to the shown example, and may be coupled to a location requiring a vertical series connection between the battery cells 110.

As described above, the present disclosure is characterized by providing a method for fabricating a battery module including placing and arranging the unidirectional battery cells 110 horizontally, facing each other with respect to the ICB frame 210, simultaneously welding, folding and stacking the battery cells 110 together through the hinge structure provided in the ICB frame 210, and coupling the additional busbar 230 to the side of the ICB frame 210.

In the battery module, the two battery cells 110 facing each other may be horizontally connected in series through the busbars formed in the ICB assembly 201. For example, the busbars 221c shown in FIG. 7 play the role.

According to the present disclosure, in the fabrication of the battery module in which the battery cells are horizontally stacked, facing each other, there is no need to repeat stacking and welding in a sequential order, as opposed to the conventional method including stacking two battery cells, facing each other, performing welding between cell leads, stacking two battery cells thereon, facing each other, performing welding between cell leads, and stacking two battery cells thereon, facing each other and performing welding between cell leads. It is possible to fabricate the battery module in a simple manner by arranging the battery cells horizontally, simultaneously welding on the top side, folding and stacking, and coupling the additional busbar on the side to vertically connect the stacked battery cells to each other. The ICB assembly of the present disclosure may be connected to other ICB assembly by applying the hinge structure to the side and folded with respect to the hinge structure, and thus it is suitable to perform the method for fabricating a battery module of the present disclosure.

Figure 13:
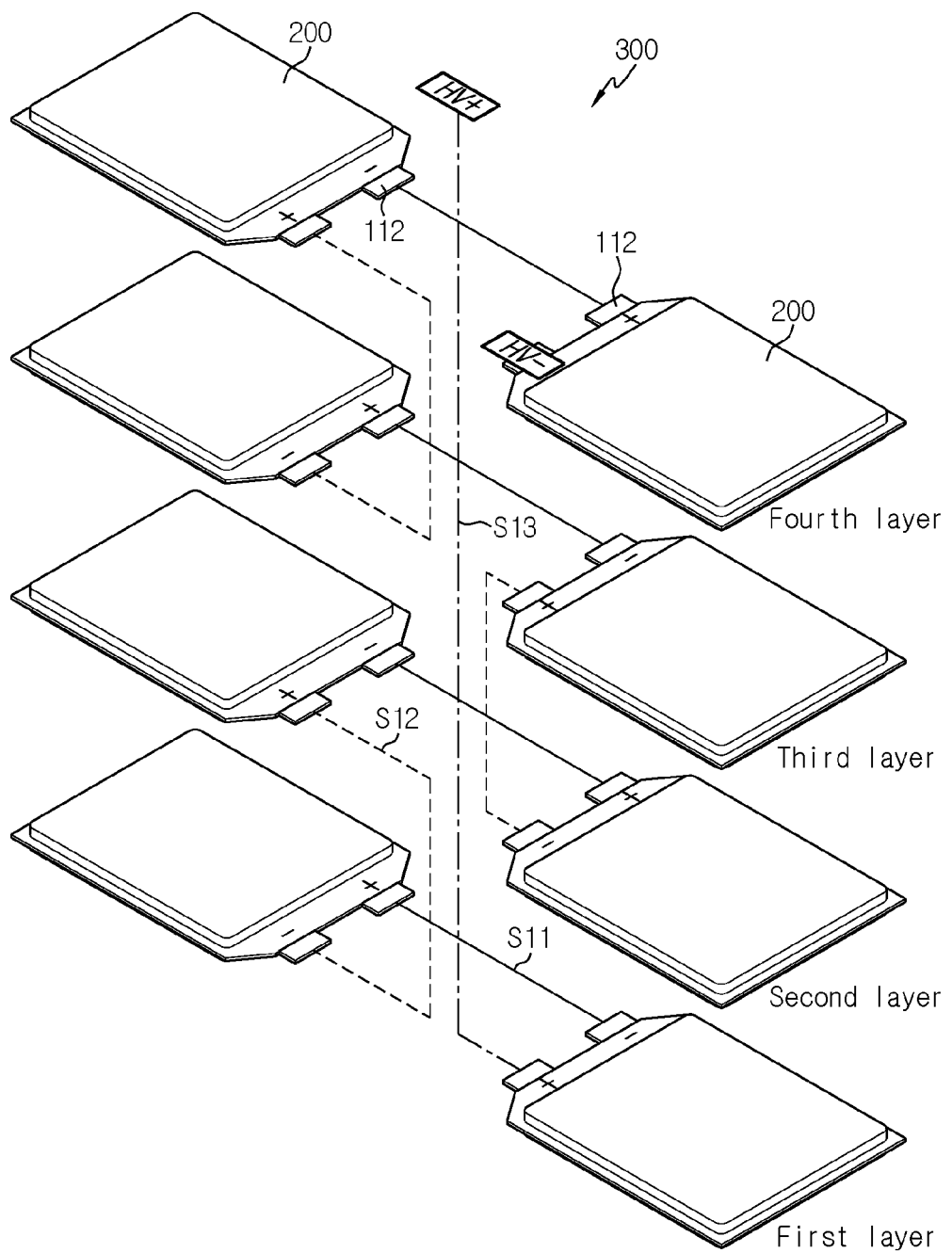
FIG. 13 shows an electrical connection relationship of a 3P8S battery module according to another embodiment of the present disclosure.

FIG. 13 shows an electrical connection relationship of a 3P8S battery module according to another embodiment of the present disclosure.

Figure 5:
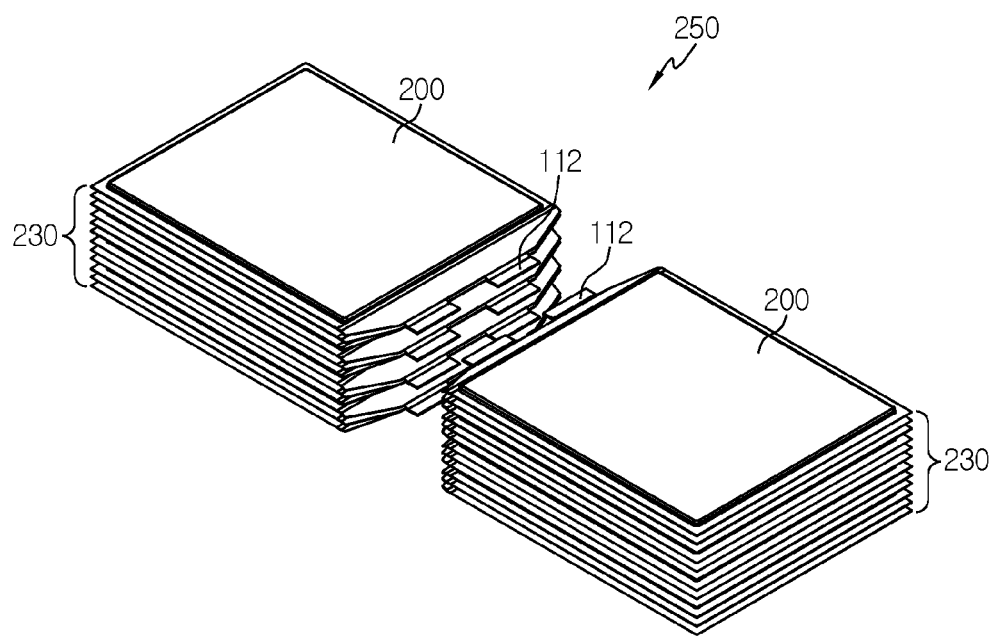
FIG. 5 shows an example of a battery module of horizontal stack structure including unit cells of FIG. 4.

In FIG. 13, the battery module 300 includes unit cells 200 as shown in FIG. 5. Additionally, the unit cells 200 facing each other are arranged and stacked in a total of four layers in the heightwise direction from the ground such that the front surfaces are placed up, and Hv terminal [positive Hv (Hv+) and negative Hv (Hv−)] is disposed on top of the battery module 300. The cell leads 112 of the unit cells 200 placed in upper and lower positions are arranged such that polarity alternates between positive and negative. The cell leads 112 of the unit cells 200 facing each other are opposite in polarity.

There are a large number of possible electrical connection relationships between the unit cells 200 that make up the battery module 300. The present disclosure provides the easiest and simplest connection.

When a first layer, a second layer, a third layer and a fourth layer are designated in a sequential order in the heightwise direction from the ground, the cell leads 112 of the unit cells 200 facing each other in each layer of the first to fourth layers may be horizontally connected in series (S11) as indicated by the solid line. The cell leads 112 of the unit cells 200 placed in upper and lower positions may be vertically connected in series (S12) as indicated by the dash line.

For example, the negative cell lead 112 of the right unit cell 200 in the fourth layer is connected to the negative Hv (Hv−) on top of the battery module 300. The positive cell lead 112 of the right unit cell 200 in the fourth layer is connected to the negative cell lead 112 of the left unit cell 200 in the fourth layer, so that the left unit cell 200 and the right unit cell 200 in the fourth layer are horizontally connected in series (S11). The positive cell lead 112 of the left unit cell 200 in the fourth layer is connected to the negative cell lead 112 of the left unit cell 200 in the third layer, so that the left unit cell 200 in the fourth layer and the left unit cell 200 in the third layer are vertically connected in series (S12). The positive cell lead 112 of the left unit cell 200 in the third layer is connected to the negative cell lead 112 of the right unit cell 200 in the third layer, so that the left unit cell 200 and the right unit cell 200 in the third layer are horizontally connected in series (S11). The positive cell lead 112 of the right unit cell 200 in the third layer is connected to the negative cell lead 112 of the right unit cell 200 in the second layer, so that the right unit cell 200 in the third layer and the right unit cell 200 in the second layer are vertically connected in series (S12). The positive cell lead 112 of the right unit cell 200 in the second layer is connected to the negative cell lead 112 of the left unit cell 200 in the second layer, so that the right unit cell 200 and the left unit cell 200 in the second layer are horizontally connected in series (S11). The positive cell lead 112 of the left unit cell 200 in the second layer is connected to the negative cell lead 112 of the left unit cell 200 in the first layer, so that the left unit cell 200 in the second layer and the left unit cell 200 in the first layer are vertically connected in series (S12). The positive cell lead 112 of the left unit cell 200 in the first layer is connected to the negative cell lead 112 of the right unit cell 200 in the first layer, so that the left unit cell 200 and the right unit cell 200 in the first layer are horizontally connected in series (S11). The positive cell lead 112 of the right unit cell 200 in the first layer is connected in series (S13) to the positive Hv (Hv+) on top of the battery module 300 as indicated by the dotdash line.

In this embodiment, the battery module 300 is fabricated by applying one ICB frame to every two cell bank unit cells 200 in each layer of the first to fourth layers. One ICB frame is connected between the unit cells 200 in FIG. 13. That is, the ICB frame is required in each layer, and two unit cells 200 are placed on the ICB frame. As described above, the ICB frame connecting two unit cells 200 in the horizontal direction is referred to as type 1 ICB frame. In this embodiment, since there are eight unit cells 200 in total, four type 1 ICB frames in total are required. The ICB frames may be connected side by side in the lengthwise direction, and a busbar frame has busbars of different shapes to realize various electrical connection relationships.

In this embodiment, the ICB assembly may include two unit cells including unidirectional battery cells having cell leads at one end, connected such that the cell leads face each other. Each time the number of unit cells connected in series increases by two, the ICB assembly increases by one. Accordingly, when the number of unit cells connected in series increases to four, six, eight, etc., the number of ICB assemblies required is two, three, four, etc., respectively. With regard to the ICB assembly, description not made herein is the same as that of the previous embodiment.

Hereinafter, a battery module according to another embodiment of the present disclosure and a method for fabricating the same will be described with reference to FIG. 6 and FIGS. 13 to 25.

In this embodiment, first, according to S1 of FIG. 6, an ICB assembly is prepared (S1).

Figure 14:
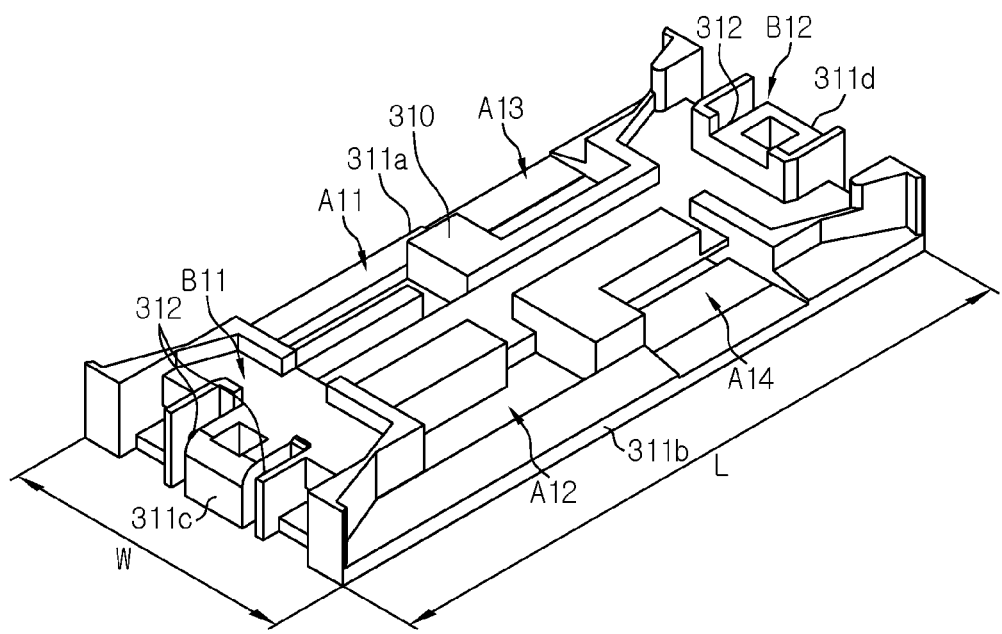
FIG. 14 is a perspective view of an interconnect board (ICB) frame according to another embodiment of the present disclosure.

FIG. 14 is a perspective view of an ICB frame according to another embodiment of the present disclosure, type 1 ICB frame having no busbar.

Referring to FIG. 14, the ICB frame 310 may be provided between unidirectional battery cells (in this embodiment, the unit cells 200 of FIG. 4) such that cell leads face each other. The unidirectional battery cells are placed facing each other on two sides of the ICB frame 310, and thus the ICB frame 310 may be referred to as a 'central' ICB frame.

The ICB frame 310 has cell lead mounting parts A11~A14 and Hv terminal mounting parts B11, B12. The ICB frame 310 is a plate-shaped structure that occupies an approximately rectangular space having a length L approximately equal to the side of the cell lead of the battery cell so that the cell lead of the battery cell can be placed, and a narrower width W.

The cell lead mounting parts A11~A14 are formed at two places on each of first and second sides 311a, 311b of the lengthwise L direction such that unidirectional battery cells are placed, facing each other, on two sides with respect to the lengthwise L direction center line of the ICB frame 310. Accordingly, the first cell lead mounting part A11 and the third cell lead mounting part A13 are formed along the first side 311a, and the second cell lead mounting part A12 facing the first cell lead mounting part A11 and the fourth cell lead mounting part A14 facing the third cell lead mounting part A13 are formed along the second side 311b.

For example, the cell leads of the left unit cell are placed on the cell lead mounting parts A11, A13 formed on the first side 311a, and cell leads of a different unit cell facing the left unit cell, for example, the right unit cell are placed on the cell lead mounting parts A12, A14 formed on the second side 311b.

The Hv terminal mounting parts B11, B12 are respectively formed on the third and fourth sides 311c, 311d of the widthwise W direction perpendicular to the sides 311a, 311b of the lengthwise L direction. The first Hv terminal mounting part B11 is formed on the third side 311c, and the second Hv terminal mounting part B12 is formed on the fourth side 311d.

The ICB frame 310 shown has busbars on the upper surface. The cell leads 112 of the unit cells 200 are placed on the busbars, and an electrical connection to the cell leads 112 of the unit cells 200 is established on the upper surface of the ICB frame 310. Additionally, since the ICB frame 310 has the first to fourth cell lead mounting parts A11~A14 and the first and second Hv terminal mounting parts B11, B12 on the upper surface, the upper surface of the ICB frame 310 has projected and recessed portions, forming steps. In contrast, the lower surface of the ICB frame 310 is not used in the electrical connection, and may be generally flat. The ICB frame 310 may be made of a plastic molding material. Additionally, the ICB frame 310 may be designed with the thickness (the thickness in the heightwise direction from the ground) that is similar to the thickness (the thickness in the heightwise direction from the ground) of the unit cell 200. When the unit cell 200 increases in thickness with the increasing number of battery cells included in the unit cell 200, then the ICB frame 310 also increases in thickness. However, when it is impossible to continue to increase the thickness of the ICB frame 310 indefinitely, a separate structure such as a spacer that is placed on the ICB frame 310 may be introduced to bring an additionally increased thickness to the ICB frame 310 so that the thickness of the ICB frame 310 is equal to the thickness of the unit cell 200.

Figure 15:
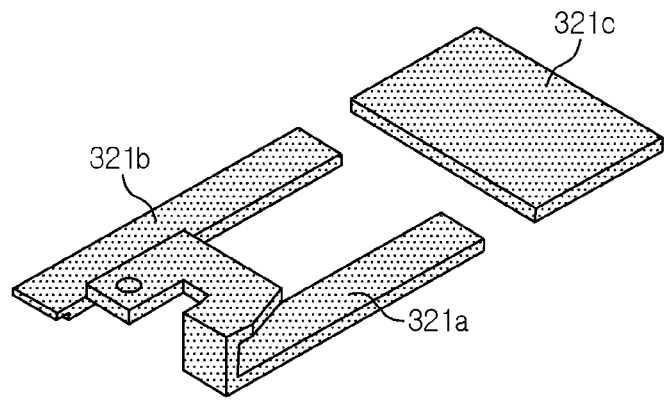
FIGS. 15 to 17 are perspective views of ICB assemblies used in a battery module according to another embodiment of the present disclosure.
Figure 15:
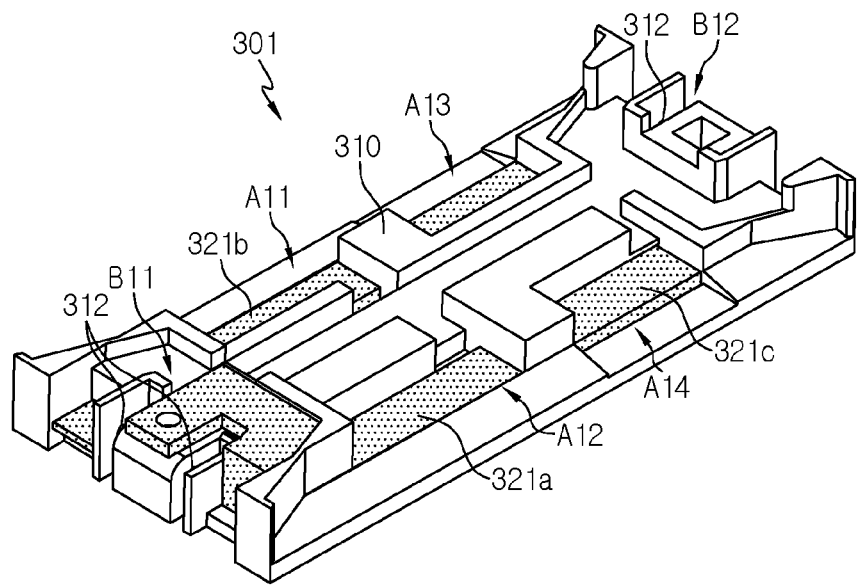
Figure 16:
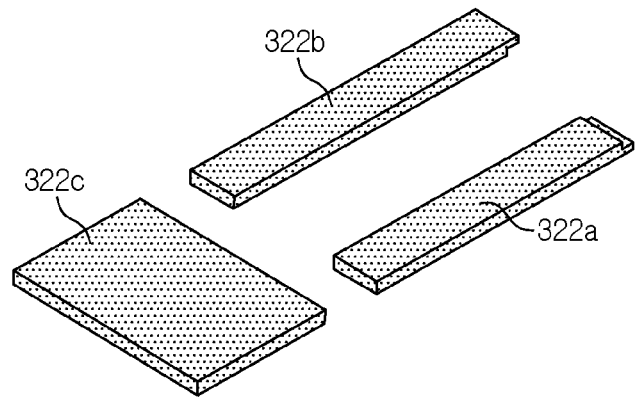
Figure 16:
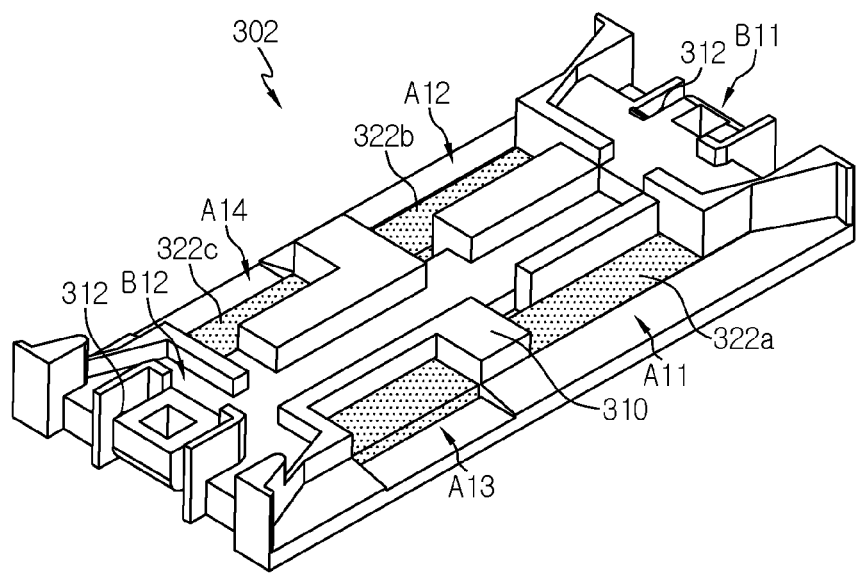
Figure 17:
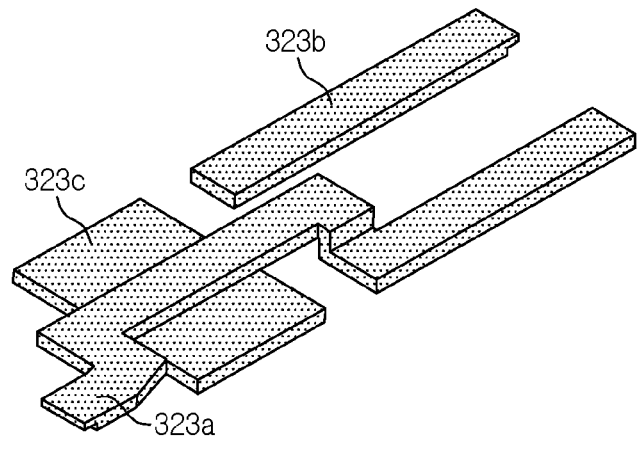
Figure 17:
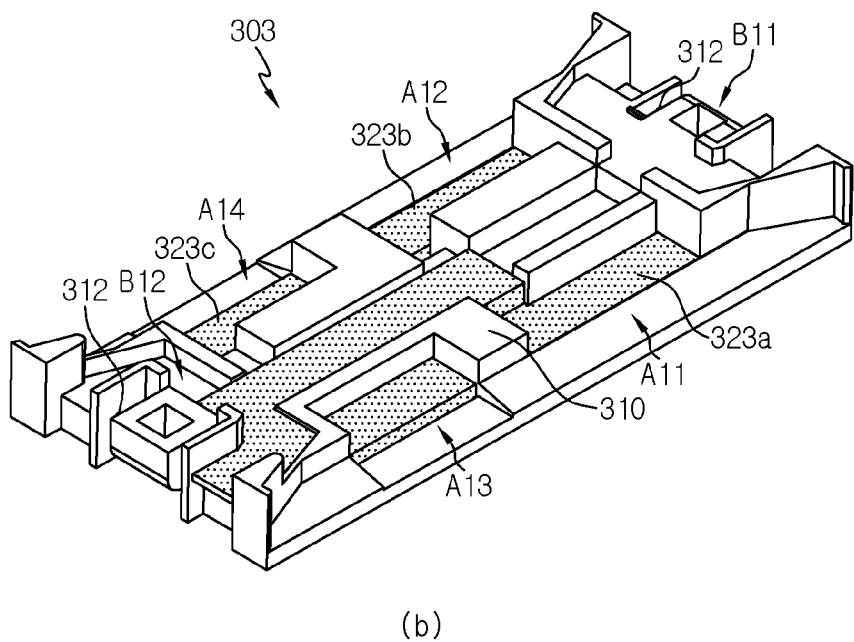

FIGS. 15 to 17 show various ICB assemblies according to the present disclosure. Each drawing (a) shows busbars and (b) shows the ICB frame having the busbars of (a).

Referring to FIGS. 15 to 17, all the ICB assemblies 301, 302, 303 of the present disclosure include the ICB frame 310 of FIG. 7. The ICB assemblies 301, 302, 303 may further include a printed circuit board or a wire component for voltage sensing. The printed circuit board or the wire component for voltage sensing may be further connected to the ICB assemblies 301, 302, 303. The ICB assemblies 301, 302, 303 include the ICB frame 310 and the busbars of many shapes in combination. The busbars are formed in the ICB frame 310 and electrically connected to the cell leads 112 of the unit cell 200.

First, the ICB assembly 301 of FIG. 15 is used for the fourth layer present in the top layer of the electrical connection relationship of FIG. 13, and includes the ICB frame 310 and busbars 321a, 321b, 321c. The busbars 321a, 321b, 321c may be formed in the ICB frame 310 by assembling, or the busbars 321a, 321b, 321c and the ICB frame 310 may be integrally formed through insert molding.

The busbar 321a is a Hv terminal busbar, and includes a portion placed on the first Hv terminal mounting part B11 and a portion placed on the second cell lead mounting part A12. In the subsequent process, the busbar 321a is connected to the negative cell lead 112 of the right unit cell 200 in the fourth layer. Accordingly, the busbar 321a forms negative Hv (Hv−) on top of the battery module 300.

The busbar 321b is a connecting busbar including a portion placed on the first cell lead mounting part A11. The busbar 321c is a through busbar, and is placed on both the third and fourth cell lead mounting parts A13, A14. In the subsequent process, the busbar 321c is connected to both the cell lead of the unit cell placed on the third cell lead mounting part A13 and the cell lead of a different unit cell placed on the fourth cell lead mounting part A14 on the opposite side, to connect in series the two unit cells facing each other. Accordingly, the busbar 321b is configured to establish the horizontal series connection "S11" of FIG. 13 between the unit cells facing each other. As described above, the ICB assembly 301 is a component that establishes the series connection S11 between the two unit cells 200 present in the fourth layer in the top layer of the battery module 300 in the electrical connection relationship of FIG. 13 through the busbar 321c, and forms the negative Hv (Hv−) on top of the battery module 300 through the busbar 321a.

The ICB assembly 302 of FIG. 16 is an assembly of the ICB frame 310 in a 180° horizontal rotation relationship of the ICB frame 310 of FIG. 14 and busbars 322a, 322b, 322c, and is a component for use in the third and second layers present in the intermediate layer of the electrical connection relationship of FIG. 13. Likewise, the busbars 322a, 322b, 322c may be formed in the ICB frame 310 through assembling, or the ICB frame 310 and the busbars 322a, 322b, 322c may be integrally formed through insert molding.

The busbar 322a is a connecting busbar, and is formed in the first cell lead mounting part A11. The busbar 322b is also a connecting busbar, and is formed in the second cell lead mounting part A12.

The busbar 322c of FIG. 16 is the same as the busbar 321c of FIG. 15. The busbar 322c is a through busbar, and is placed on the third and fourth cell lead mounting parts A13, A14. Accordingly, the busbar 322c establishes the horizontal series connection "S11" of FIG. 13 between the unit cells facing each other.

Two ICB assemblies 302 are required, and one may be used to establish the series connection S11 between the two unit cells in the third layer in the electrical connection relationship of FIG. 13 through the busbar 322c, and the other may be used to establish the series connection S11 between the two unit cells in the second layer in the electrical connection relationship of FIG. 13 through the busbar 322c.

The ICB assembly 303 of FIG. 17 is an assembly of the ICB frame 310 in a 180° horizontal rotation relationship with the ICB frame 310 of FIG. 14 and busbars 323a, 323b, 323c, and is a component for used in the first layer present in the bottom layer of the electrical connection relationship of FIG. 13. Likewise, the busbars 323a, 323b, 323c may be formed in the ICB frame 310 through assembling, or the ICB frame 310 and the busbars 323a, 323b, 323c may be integrally formed through insert molding.

The busbar 323a is a Hv extended busbar, and is used for connection to the positive Hv (Hv+) formed on top of the battery module 300. The busbar 323a is used for series connection from bottom of the battery module 300 to top, and in the subsequent process, the positive cell lead 112 of the right unit cell 200 in the first layer is connected to the busbar 323a to establish "S13" of FIG. 13. The busbar 323a includes a portion placed on the second Hv terminal mounting part B12 of the ICB frame 310 and a portion placed on the first cell lead mounting part A11.

The busbar 323b is a connecting busbar, and formed in the second cell lead mounting part A12. The busbars 321a, 322a, 322b, 323b are all the connecting busbars, and may have the same shape.

The busbar 323c of FIG. 17 is the same as the busbars 321c, 322c described above in FIGS. 15 and 16. The busbar 323c is formed on the third and fourth cell lead mounting parts A13, A14. In the same way as the busbars 321c, 322c, the busbar 323c is simultaneously connected to the cell lead of the unit cell placed on the third cell lead mounting part A13 and the cell lead of the unit cell placed on the fourth cell lead mounting part A14 at the opposite side to establish a series connection between the battery cells facing each other. Accordingly, the busbar 323c is configured to horizontally connect in series the unit cells facing each other, establishing "S11" of FIG. 13. The ICB assembly 303 establishes the series connection (S11) between the two unit cells 200 in the first layer present at the lowest layer of the battery module 300 in the electrical connection relationship of FIG. 13 through the busbar 323c, and the series connection (S13) between the positive cell lead 112 of the right unit cell 200 in the first layer and the positive Hv (Hv+) on top of the battery module 300 through the busbar 323a.

As described above, the busbars 321a, 321b, 321c, 322a, 322b, 322c, 323a, 323b, 323c are a combination of busbars selected considering the electrical connection relationship between the unit cells 200.

Meanwhile, the shape of the ICB assemblies 301, 302, 303 shown in FIGS. 15 to 17 is provided for illustration only and the ICB assembly of the preset disclosure may have other shapes. In this embodiment, a 3P8S battery module is taken as an example. As the unit cells 200 are connected in parallel using 3P structure, the busbars 321a, 321b, 321c, 322a, 322b, 322c, 323a, 323b, 323c of the ICB frame 310 are taken as an example for series connection of the unit cells 200. It should be understood that the shape of the ICB frame, and the shape and location of the busbar may differ depending on series/parallel connection structure in the battery module.

Subsequently, according to S2 of FIG. 6, the ICB assemblies are laterally connected (S2).

Figure 18:
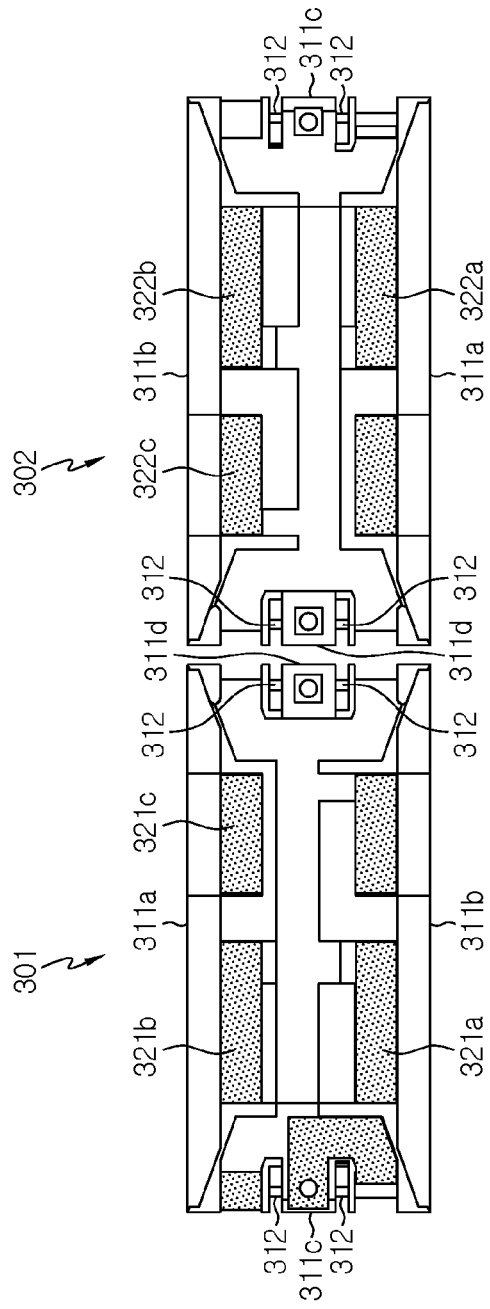
FIG. 18 is a diagram illustrating a connection method of ICB assemblies according to another embodiment of the present disclosure.

The ICB assemblies 301, 302, 303 may be connected side by side in the lengthwise L direction of the ICB frame 310. That is, the ICB assemblies 301, 302, 303 may be connected to other ICB frame 310 in the lengthwise L direction of the ICB frame 310. For example, as shown in FIG. 18, the ICB assembly 302 may be placed next to the ICB assembly 301 and they may be connected to each other. FIG. 18 shows the fourth side 311d of the ICB frame 310 of the ICB assembly 301 placed next to the fourth side 311d of the ICB frame 310 of the ICB assembly 302.

Figure 19:
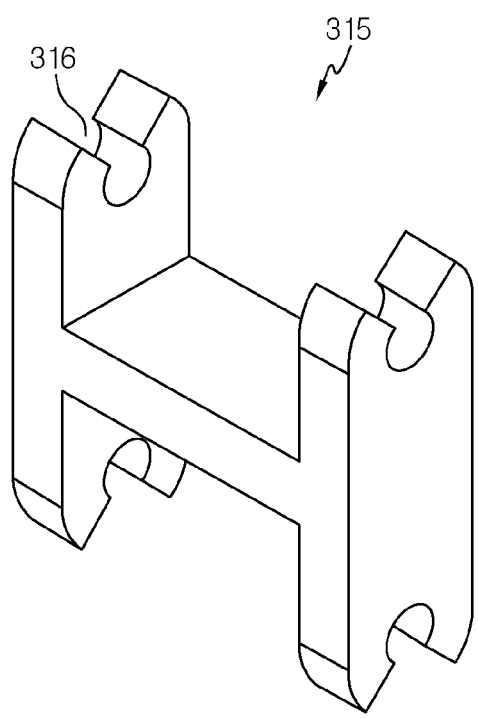
FIG. 19 is a perspective view of a joint element used to connect ICB assemblies.

In this instance, a joint element 315 as shown in FIG. 19 may be used. It is desirable to connect two ICB frames 310 with a hinge structure so that the ICB frames 310 pivot around the joint element 315. To this end, a rod-shaped protrusion 312 is formed on the side of the ICB frame 310, and the two ICB frames 310 arranged along the lengthwise L direction may be connected with the joint element 315 between their sides. In this embodiment, the joint element 315 is in an approximately H shape and has a groove 316 at four ends. The protrusions 312 formed on the sides of the ICB frame 310, and in this embodiment, the third and fourth sides 311c, 311d may be inserted into the grooves 316.

Figure 20:
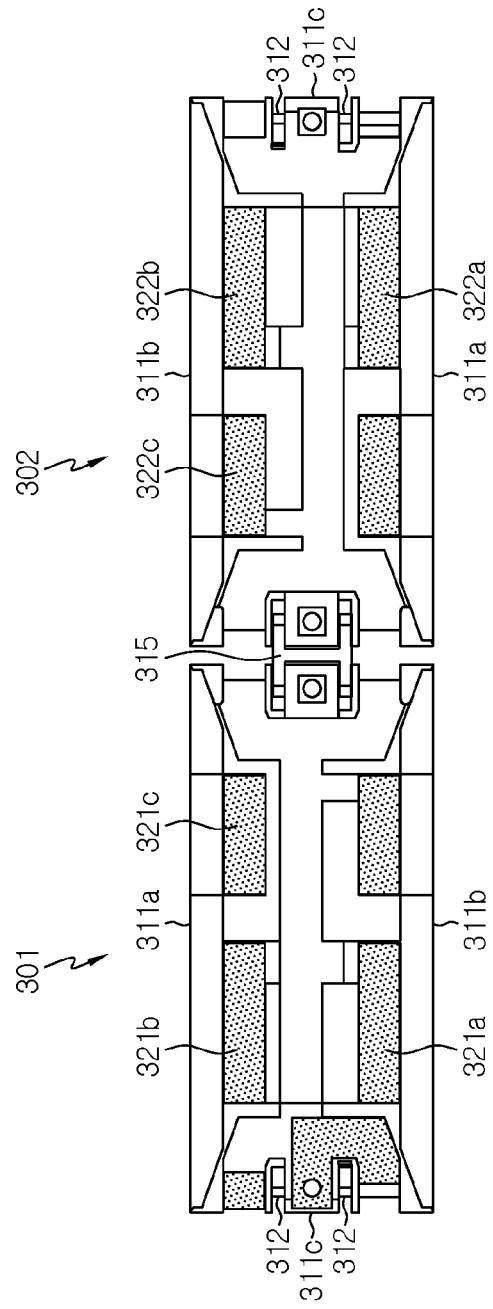
FIG. 20 shows ICB assemblies connected using the joint element of FIG. 19.

FIG. 20 shows that the side of the ICB frame 310 of the ICB assembly 301 is connected to the side of the ICB frame 310 of the ICB assembly 302 along the lengthwise direction using the joint element 315.

When the rod-shaped protrusions 312 are formed on the third and fourth sides 311c, 311d of the ICB frame 310 and the grooves 316 of the joint element 315 are formed in the shape of letter C for insertion of the rod, the two ICB frames 310 may be connected by inserting the protrusions 312 of the ICB frame 310 into the openings of the grooves 316. Additionally, when the protrusion 312 rotates within the groove 316 or the groove 316 moves around the protrusion 312, the two ICB frames 310 may pivot around the joint element 315.

In this embodiment, an example is cited in which the two protrusions 312 of the ICB frame 310 on one side are each inserted into two ends of the joint element 315, the two protrusions 312 of the ICB frame 310 on the other side are each inserted into two ends on the opposite side, and an approximately H shape is placed on the plane lying down along the lengthwise direction of the ICB frame 310. If a hinge connection structure can be realized, the structure of the joint element 315 and the protrusion 312 is not limited to the shown example, and may be variously formed.

As described above, the ICB frames 310 of the ICB assemblies 301, 302, 303 prepared as described above are laterally connected with the hinge structure and arranged in the lengthwise L direction of the ICB frame 310, and subsequently, S2 of FIG. 6 is performed.

Figure 21:
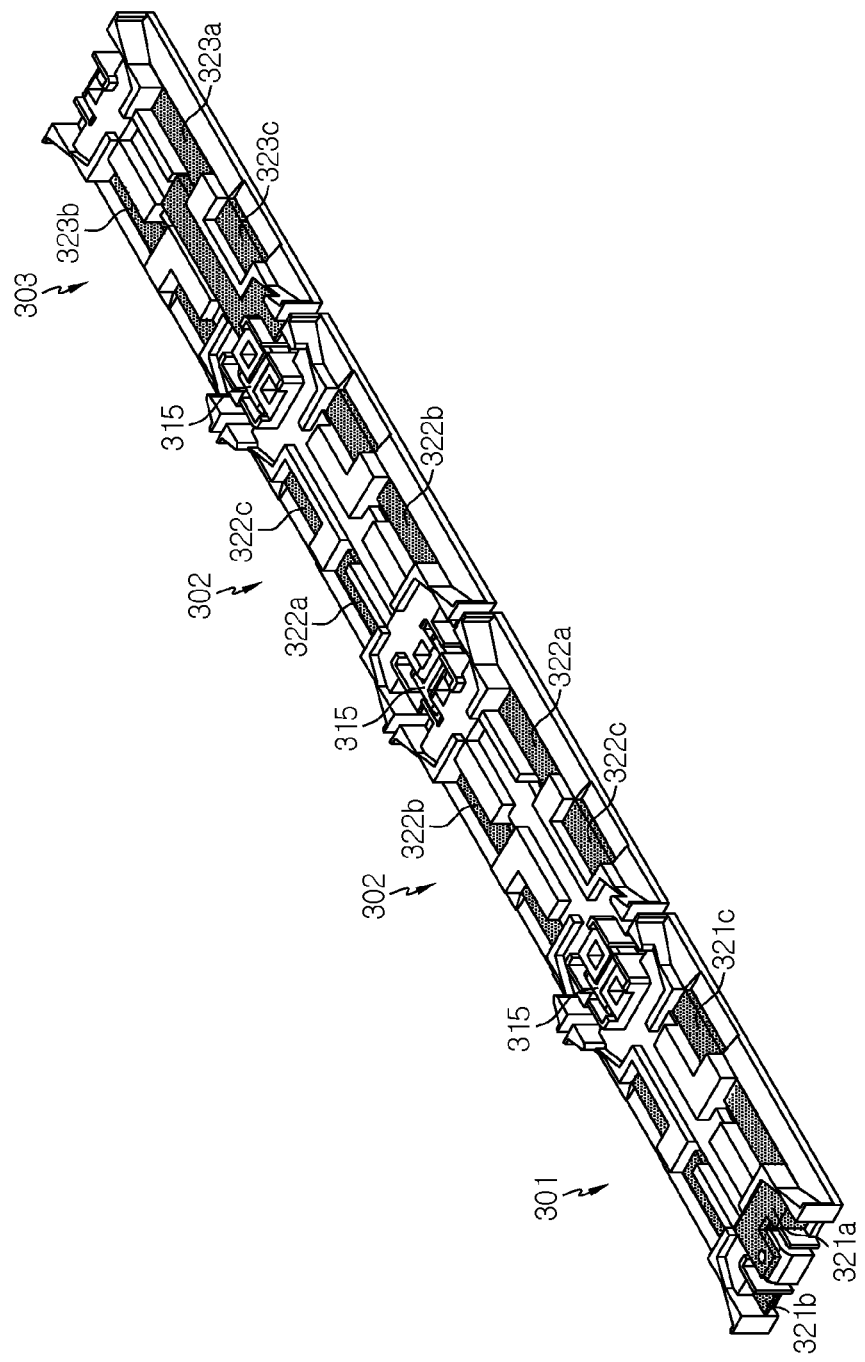
FIG. 21 shows four ICB assemblies of FIGS. 15 to 17 arranged by side connection.

FIG. 21 shows four ICB frames 310 of the ICB assemblies 301, 302, 303 laterally connected and arranged in the lengthwise L direction using the joint element 315 as described in FIG. 19.

To the ICB frame 310 of the leftmost ICB assembly 301, the ICB frame 310 of the next ICB assembly 302 is horizontally connected by 180°. To the ICB frame 310 of the ICB assembly 302, the ICB frame 310 of the right ICB assembly 302 is horizontally connected by 180° in the same direction as the ICB frame 310 of the ICB assembly 301.

The ICB frame 310 of the rightmost ICB assembly 303 is horizontally connected by 180°.

In this embodiment, a 3P8S battery module is taken as an example. Since two unit cells 200 may be connected to one ICB frame 310, it should be understood that four ICB frames 310 are necessary to connect a total of eight unit cells. Additionally, it can be seen that the number of ICB frames required may vary depending on the number of unit cells in the battery module.

Subsequently, according to S3 of FIG. 6, the battery cells are arranged (S3). Subsequently, according to S4 of FIG. 6, the busbar and the cell lead are welded together (S4).

Figure 22:
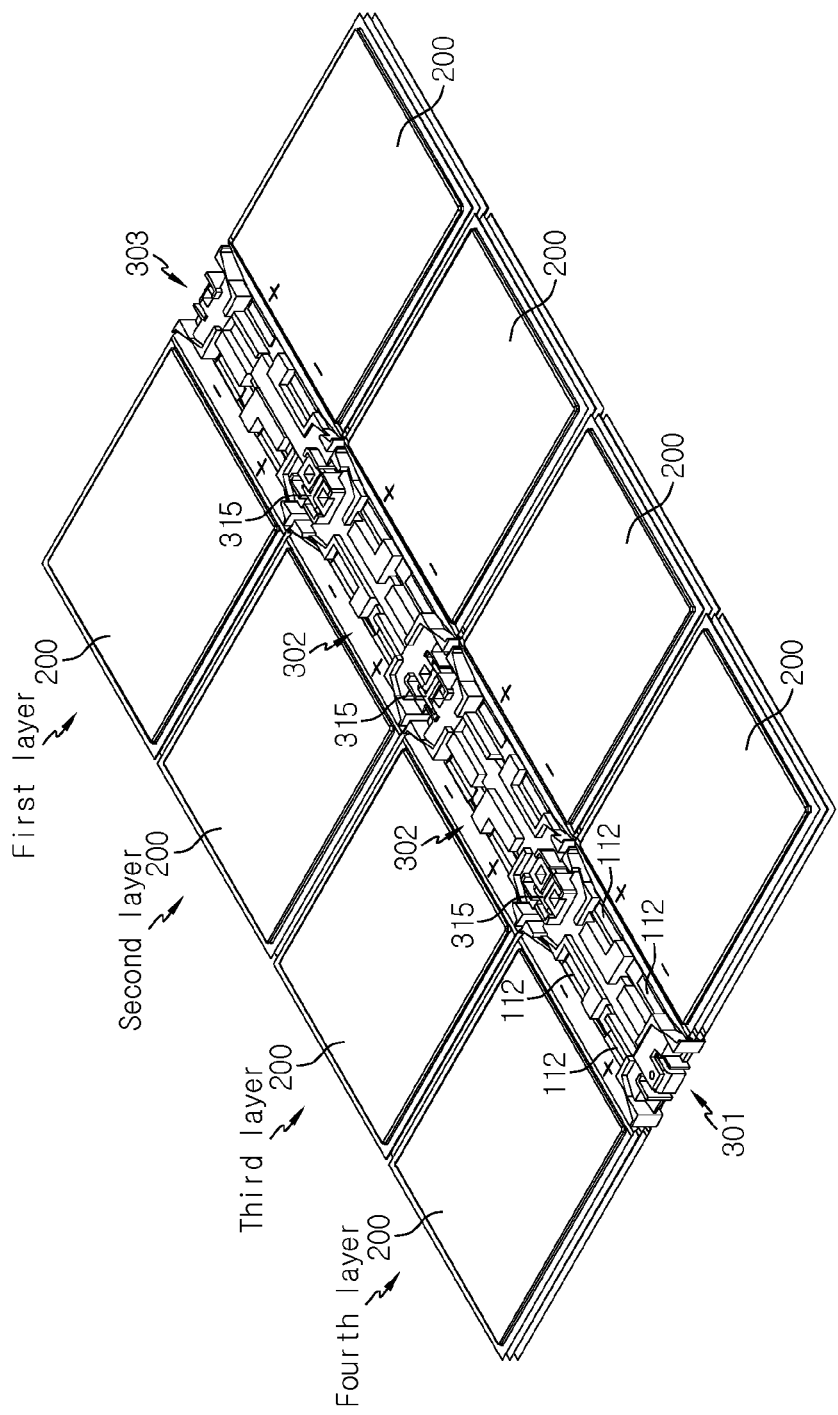
FIG. 22 is a diagram illustrating a unit cell mounting step and a top welding step in a method for fabricating a battery module according to another embodiment of the present disclosure.

FIG. 22 is a diagram illustrating the unit cell mounting step and the welding step in a method for fabricating a battery module according to another embodiment of the present disclosure.

Figure 4:
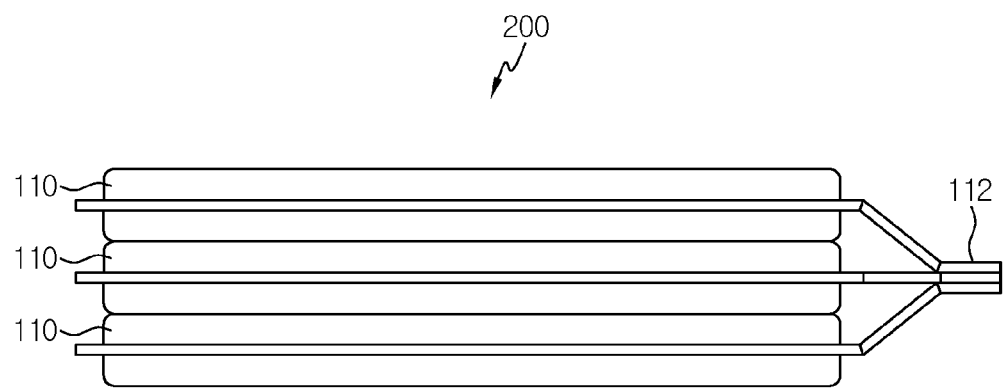
FIG. 4 is a side view of a unit cell that may be included in the conventional battery module.

As shown in FIG. 21, the necessary number of ICB assemblies 301, 302, 303 are arranged and their ICB frames 310 are laterally connected with the joint element 315, and referring to FIG. 22, the cell leads 112 of the unit cell 200 as described in FIG. 4 are mounted on the cell lead mounting parts A11~A14 of the ICB frame 310. The unit cells 200 are placed on the left and right sides with respect to one ICB frame 310. In the ICB assemblies 301, 302, 303, each cell lead mounting part A11~A14 of the ICB frame 310 has the busbars 321a, 321b, 321c, 322a, 322b, 322c, 323a, 323b, 323c. The cell leads 112 of the unit cells 200 are placed on the busbars 321a, 321b, 321c, 322a, 322b, 322c, 323a, 323b, 323c.

In this instance, the cell leads 112 facing each other with respect to the ICB frame 310 are opposite in polarity to realize the electrical connection relationship as shown in FIG. 13. To realize a different electrical connection relationship from that of FIG. 13, the cell leads 112 facing each other may have the same polarity, and accordingly, the type and shape of busbars coupled to the ICB frame 310 may differ, and as a consequence, the shape of the ICB frame 310 may differ.

To help understanding, FIG. 22 shows the corresponding parts to the first to fourth layers in the electrical connection relationship of FIG. 13. A total of eight unit cells 200 are all horizontally arranged such that the cell leads 112 of each unit cell 200 are mounted on the busbars 321a, 321b, 321c, 322a, 322b, 322c, 323a, 323b, 323c, and the cell leads 112 of each unit cell 200 and the underlying busbars 321a, 321b, 321c, 322a, 322b, 322c, 323a, 323b, 323c are welded together on the top side to connect them. Accordingly, the ICB assemblies 301, 302, 303 and the unit cells 200 are connected. Laser welding or ultrasonic welding may be used. When a wire component for voltage sensing is further included, the component may be welded together in this process.

When the welding of FIG. 22 is performed, the unit cells 200 facing each other are connected to the through busbars 321c, 322c, 323c and thereby electrically connected to each other, while the other unit cells 200 placed side by side along the arrangement direction of the ICB frames 310 are not electrically connected to each other. That is, although FIG. 13 shows that the cell leads 112 of the unit cells 200 facing each other are horizontally connected in series (S11), the cell leads 112 of the unit cells 200 placed in upper and lower positions are not vertically connected in series (S12).

Figure 23:
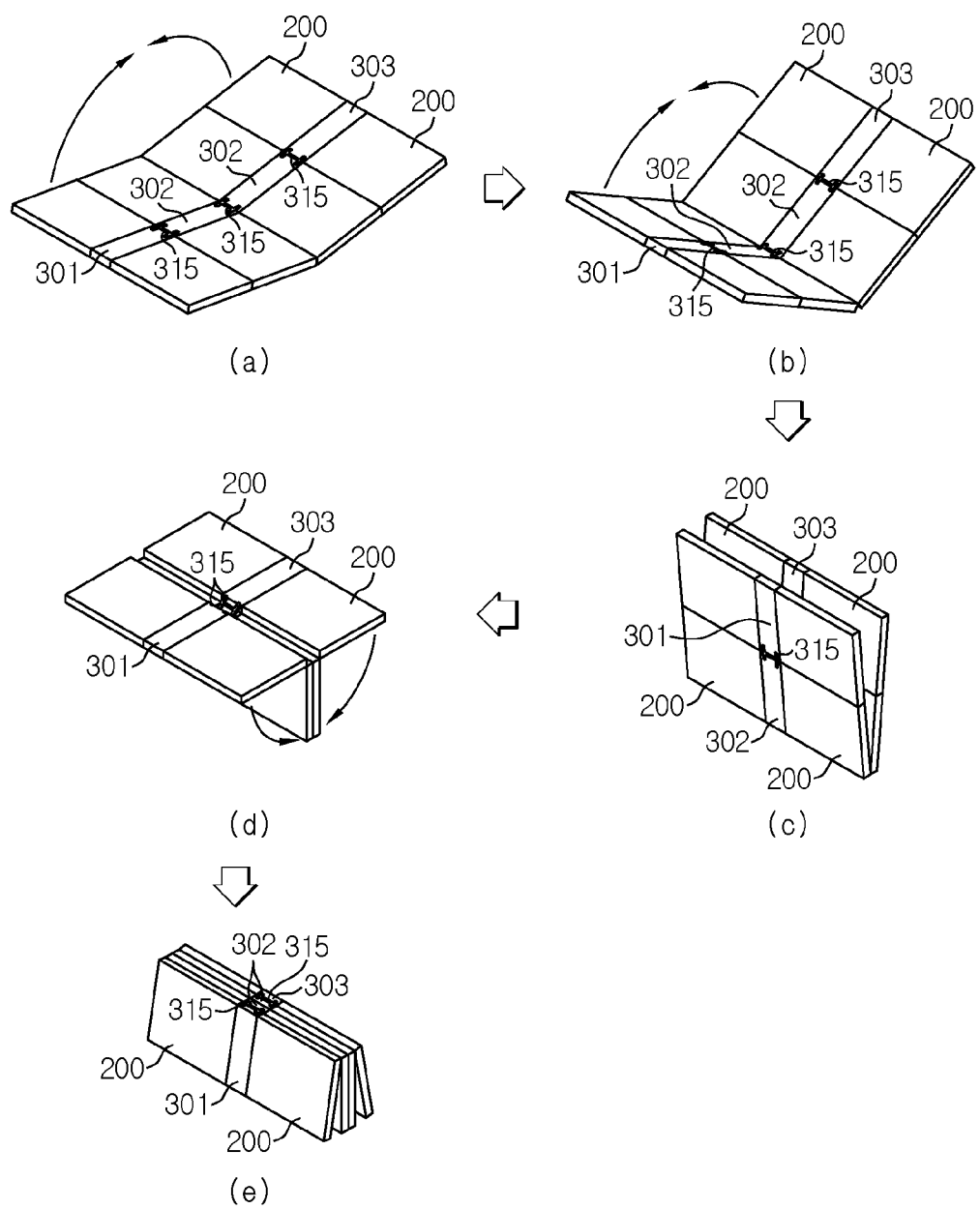
FIG. 23 is a diagram illustrating the step of stacking unit cells in a hinged manner in a method for fabricating a battery module according to another embodiment of the present disclosure.

Now, when the arranged ICB frames 310 are folded up in a zigzag fashion with respect to the hinge part or the joint element 315, the unit cells 200 are stacked in a hinged structure. For example, folding may be performed by a method shown in FIG. 23. FIG. 23 is a diagram illustrating the step of stacking the unit cells in a hinged manner in the method for fabricating a battery module according to the present disclosure.

Figure 24:
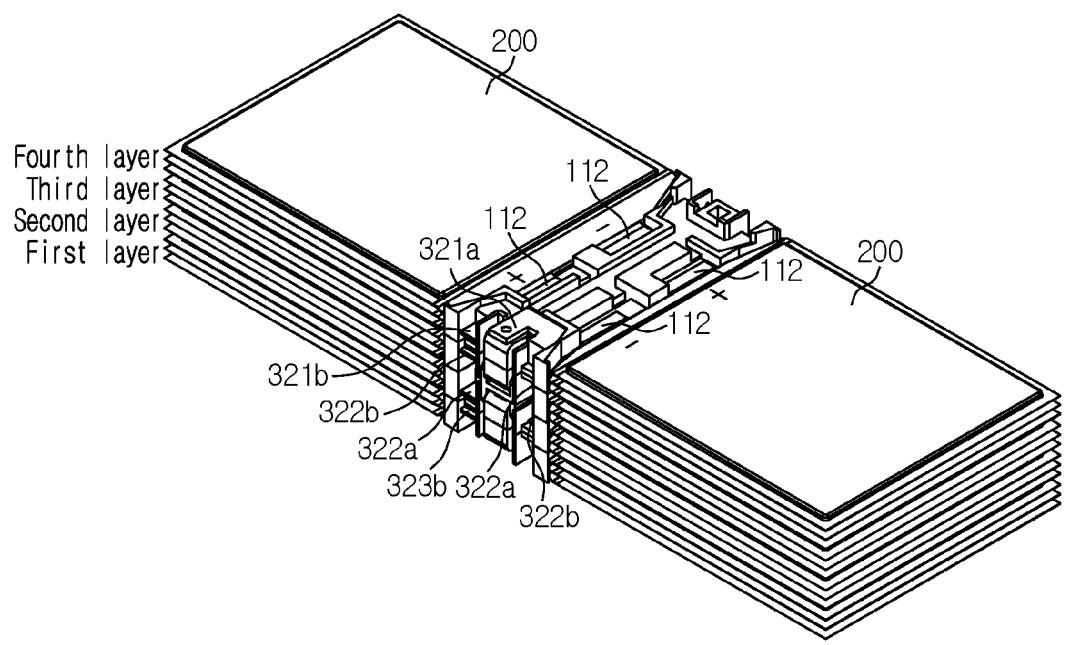
FIG. 24 is a perspective view of unit cells stacked by the method of FIG. 23.

Referring to FIG. 23, first, as shown in (a), it is folded in half inward from the center. That is, the structure of FIG. 22 is folded in half with respect to the joint element 315 between the two ICB assemblies 302. Subsequently, it is completely folded in the order of (b) and (c) of FIG. 23, and as shown in (d), the outermost unit cell 200 is folded down outward. That is, it is folded with respect to the joint element 315 between the ICB assembly 301 and the ICB assembly 302 and the joint element 315 between the ICB assembly 302 and the ICB assembly 303. Then, as shown in (e), it may be folded and stacked in an inverted W shape, and finally, as shown in FIG. 24, it may be folded with a structure in which a total of four layers, first to fourth layers, are stacked. FIG. 24 shows that the fourth layer in the electrical connection relationship of FIG. 13 is placed on top.

Now, according to S6 of FIG. 6, the additional busbar is coupled (S6).

Figure 25:
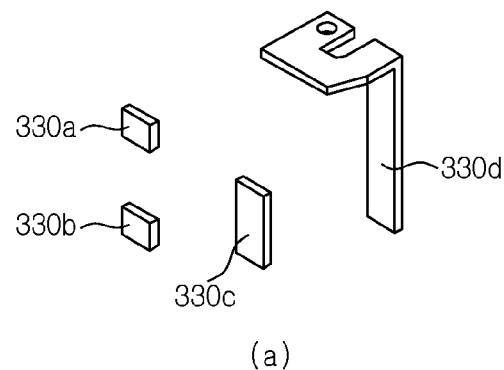
FIG. 25 is a diagram illustrating the step of coupling an additional busbar additionally needed to complete a series connection of unit cells in a method for fabricating a battery module according to another embodiment of the present disclosure.
Figure 25:
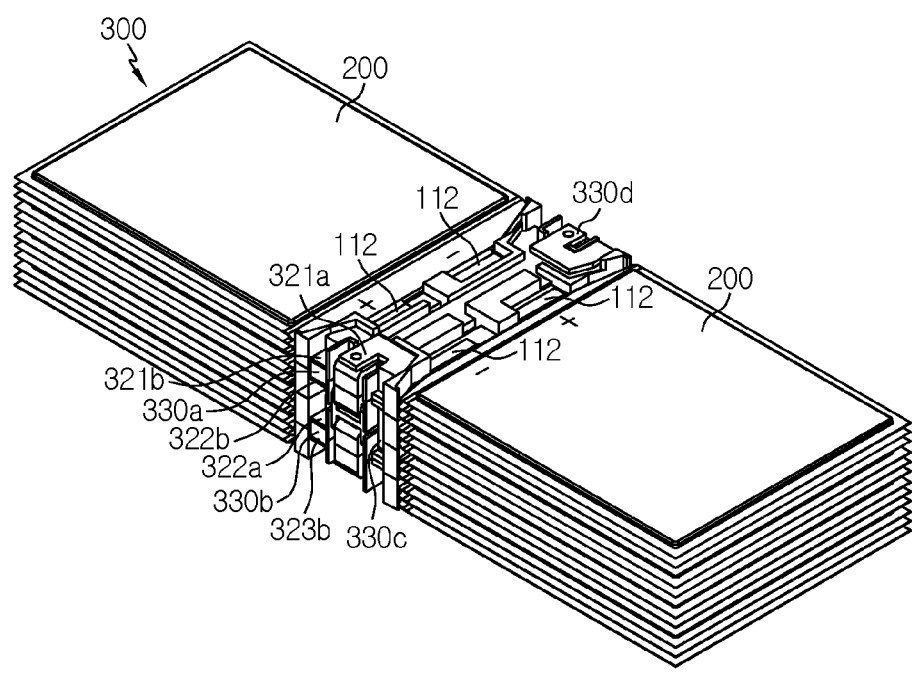

FIG. 25 is a diagram illustrating the step of connecting the unit cells in series, in detail, the vertical series connection (S12) and the step of coupling a separate additional busbar necessary to complete series connection (S13) from bottom to top, in the method for fabricating a battery module according to another embodiment of the present disclosure. In FIG. 25, (a) shows the additional busbar, and (b) shows that the additional busbar of (a) is coupled.

After stacking as shown in FIG. 24, an additional busbar 330a is coupled between the busbars 321b, 322b in the upper and lower layers exposed to the side of the ICB frame 310 (in the shown example, the left side, and the third side 311c of the ICB frame 310). The coupling method may be performed by overlying and welding. Through this, the busbars 321b, 322b are connected to establish a vertical series connection between the left unit cell 200 in the fourth layer and the left unit cell 200 in the third layer (S12).

Likewise, below there, an additional busbar 330b is coupled between the busbars 322a, 323b in the upper and lower layers exposed to the side. The busbars 322a, 323b are connected to each other to establish a vertical series connection (S12) between the left unit cell 200 in the second layer and the left unit cell 200 in the first layer.

Likewise, next to that, an additional busbar 330c is coupled between the busbars 322a, 322b in the upper and lower layers exposed to the side. The busbars 322a, 322b are connected to each other to establish a vertical series connection (S12) between the right unit cell 200 in the third layer and the right unit cell 200 in the second layer.

As described above, when the additional busbars 330a, 330b, 330c are coupled by placing them on the side and welding, vertical series connection (S12) is all established, and the unit cells 200 placed side by side along the arrangement direction of the ICB frames 310 in the structure of FIG. 23 and the stacked unit cells 200 placed in upper and lower positions in the structure of FIG. 24 are connected to each other.

The busbar 323a (not seen in the drawing due to its location) on the bottom is exposed to the other surface of the ICB frame 310 (in the shown example, the right side, and the fourth side 311d of the ICB frame 310). An additional busbar 330d is coupled thereto. Then, "S13" of FIG. 6 is established.

The shape and number of the additional busbars 330a, 330b, 330c, 330d may differ depending on series/parallel connection structure. In this embodiment, three additional busbars 330a, 330b, 330c of a simple rectangular shape as shown in FIG. 25 connect the unit cells 200 of neighboring upper and lower layers in stacked state. The additional busbar 330a connects the unit cells 200 in the fourth layer and the third layer. The additional busbar 330b connects the unit cells 200 in the second layer and the first layer. The additional busbar 330c connects the unit cells 200 in the third layer and the second layer.

One ¬-shaped additional busbar 330d is formed from the first layer to the fourth layer along the side of the battery module 300, one side of the additional busbar 330d is connected to the busbar 323a of the ICB assembly 303 and the positive cell lead 112 of the right unit cell 200 in the first layer, and the other side of the additional busbar 330d is mounted on the Hv terminal mounting part B12 of the ICB assembly 301 in the fourth layer to form positive Hv (Hv−).

As described above, the method for fabricating a battery module according to the present disclosure includes the step of laterally coupling the additional busbar for vertical series connection (S12) between the unit cells stacked in the heightwise direction from the ground. As described above, the battery module 300 according to an embodiment of the present disclosure as shown in FIG. 25 is completed by coupling the additional busbar. The battery module 300 has an electrical connection relationship as described in FIG. 13, and is fabricated in a simple manner through the fabrication method as described above including preparing ICB assemblies 301, 302, 303, arranging unit cells 200, simultaneously welding, and folding and stacking, without the need for complex connection considering the polarity of cell leads. As described above, according to an embodiment of the present disclosure, the battery module of horizontal stack structure including eight 3P bank unit cells 200 all connected in series to establish 3P8S electrical connection is fabricated by a very simple method.

The battery module 300 includes two unit cells 200 connected in the horizontal direction through the ICB assembly 303, two unit cells 200 connected in the horizontal direction through the ICB assembly 302, and unit cells 200 connected in the horizontal direction through the ICB assembly 301, stacked in the heightwise direction from the ground, and Hv terminals [positive Hv (Hv+) and negative Hv (Hv−)] on top of the battery module 300. The ICB assemblies 301, 302, 303 are connected with the joint element 315, the additional busbars 330a, 330b, 330c for vertical series connection of the unit cells 200 are coupled to the side of the ICB assemblies 301, 302, 303, and an additional busbar 330d for series connection from bottom to top is also coupled to the other side of the ICB assemblies 301, 302, 303. The two unit cells 200 facing each other on the plane are horizontally connected in series via the through busbars 321c, 322c, 323c formed respectively in the ICB assemblies 301, 302, 303, and the unit cells 200 stacked in the heightwise direction from the ground are vertically connected in series through the additional busbars 330a, 330b, 330c.

As described above, using the ICB assembly of the present disclosure, the battery module is fabricated by horizontally arranging the battery cells, simultaneously welding, and folding and stacking. Particularly, the ICB assembly realizes the simplest connection relationship among a large number of possible electrical connections between a plurality of battery cells. According to the method for fabricating a battery module in accordance with the present disclosure using this, it is possible to greatly simplify the fabrication step of the battery module in which the unidirectional battery cells are horizontally stacked such that the unidirectional battery cells face each other.

The battery module of the present disclosure includes the ICB assembly of the present disclosure, and thus is very easy to assemble. Additionally, it is possible to expand the battery module by increasing the number of battery cells connected in series through a simple process of additionally including a unit of battery cell—ICB assembly—battery cell. That is, the battery module of the present disclosure is fabricated by stacking the units of battery cell—ICB assembly—battery cell in the heightwise direction from the ground such that the battery units facing each other with respect to the ICB assembly are connected to each other, and thus it is possible to expand the battery module by increasing the number of units of battery cell—the ICB assembly—battery cell.

Although the above embodiment describes an embodiment in which the battery module 300 is fabricated by applying one ICB frame to every two cell bank unit cells 200 for each of the first to fourth layers, an embodiment of the ICB frame provided every two layers and four unit cells 200 placed on one ICB frame is possible. In this instance, the two unit cells 200 are placed on the upper surface of the ICB frame, and the remaining two unit cells 200 are placed on the lower surface of the ICB frame. As described above, the ICB frame connecting four unit cells 200 is referred to as type 2 ICB frame, to distinguish from the type 1 ICB frame. In the case of the battery module including eight unit cells 200 in total, two type2 ICB frames in total are necessary. Also here, the ICB frames may be connected side by side in the lengthwise direction, and the ICB frames connected to each other have all the same shape. Here, it is possible to form various electrical connection relationships by applying the busbars of different shapes. For example, the ICB assembly may be made with various configurations by applying various busbars of different shapes to the ICB frame of the same shape, for example, by applying a ⊏ busbar to a certain ICB frame and an S busbar to a different ICB frame, and the battery module may be fabricated using this.

Except the number of battery cells (or unit cells) connected to the ICB frame, the battery cells (or unit cells) connected to both the upper surface and the lower surface of the ICB frame, and accordingly, inclusion of suitable busbars, i.e., busbars that may be formed on the upper surface and the lower surface of the ICB frame, and specific electrical connection relationship, all the descriptions of the ICB assembly, the method for fabricating a battery module and the battery module according to the previously described embodiment are equally applied.

Additionally, it will be seen that first, some battery cells (or unit cells) may be arranged on the upper surface of the ICB assembly and simultaneously welded on the top side, the battery cells (or unit cells) welded to the ICB assembly may be reversed so that the lower surface of the ICB assembly is placed upside, the remaining battery cells (or unit cells) may be arranged and simultaneously welded on the top side, and the lower surface of the ICB assembly and the battery cells (or unit cells) may be connected.

Additionally, in the battery module fabricated by this method, the battery cells (or unit cells) may be connected to the upper surface and the lower surface of the ICB assembly so that four battery cells (or unit cells) are connected to one ICB assembly, and two battery cells (or unit cells) placed in the upper and lower positions may be vertically connected in series through the busbar formed in the ICB assembly.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. An interconnect board (ICB) assembly, comprising:
a monolithic ICB frame in which cell leads of unidirectional battery cells are configured to be received such that the unidirectional battery cells having the cell leads at one end are configured to be placed facing each other with the cell leads facing each other; and
busbars formed in the ICB frame and configured to be electrically connected to the cell leads,
wherein the ICB frame is configured to be connected to another ICB frame with a hinge structure in a lengthwise direction of the ICB frame,
wherein the ICB frame has rod-shaped protrusions on respective sides thereof, the sides being separated along the lengthwise direction, and
wherein the assembly further comprises a joint element separate and distinct from the ICB frame having grooves into which the protrusions are configured to be inserted, respectively, for connecting two ICB frames arranged along the lengthwise direction.

2. The ICB assembly according to claim 1, wherein the joint element is in an H shape and the grooves are at four ends of the joint element.

3. The ICB assembly according to claim 2, wherein the grooves are formed in a C shape.

4. The ICB assembly according to claim 1, wherein the ICB frame is integrally formed with the busbars by insert molding.

5. The ICB assembly according to claim 1, wherein the busbars include three busbars formed in the one ICB frame.

6. The ICB assembly according to claim 1, wherein the ICB frame is rectangular having a length along the lengthwise direction configured to be approximately equal to a side of a unidirectional battery cell having cell leads, and a width in a widthwise direction perpendicular to the lengthwise direction, the width being smaller than the length.

7. A system comprising:
two of the ICB assemblies according to claim 1, wherein the protrusions of the ICB assemblies are inserted into the grooves of the joint element, respectively, connecting the ICB frames of the two ICB assemblies along the lengthwise direction.

8. A method for fabricating a battery module, comprising:
(a) preparing a plurality of interconnect board (ICB) assemblies, each ICB assembly including: a monolithic ICB frame in which cell leads of unidirectional battery cells are configured to be received such that the unidirectional battery cells having the cell leads at one end are configured to be placed facing each other with the cell leads facing each other, and busbars formed in the ICB frame and configured to be electrically connected to the cell leads, wherein the ICB frame has rod-shaped protrusions on respective sides thereof, the sides being separated along the lengthwise direction;
(b) laterally connecting and arranging the ICB frames of the ICB assemblies in the lengthwise direction of the ICB frames with a hinge structure between adjacent ICB frames, including inserting the protrusions into respective grooves of a joint element separate and distinct from the ICB frames;
(c) mounting unidirectional battery cells on right and left sides of the lengthwise direction of the laterally connected ICB frames to horizontally arrange the battery cells such that the battery cells face each other;
(d) connecting the ICB assemblies to the arranged battery cells by welding the busbars and the cell leads together on a top side;
(e) stacking the battery cells by folding the arranged ICB frames at the hinge parts; and
(f) coupling an additional busbar between the busbars of the ICB assemblies exposed to a side.

9. The method for fabricating a battery module according to claim 8, wherein at least one of the battery cells includes bank unit cells stacked such that cell leads within the bank unit cells of same polarity are in contact with each other and connected in parallel.

10. The method for fabricating a battery module according to claim 8, wherein after the steps (c) and (d) are performed,
reversing the ICB assemblies and the battery cells connected to each other so that lower surfaces of the ICB frames are placed upward, and
connecting the ICB assemblies to the arranged battery cells by welding the busbars and the cell leads together on the lower surfaces of the ICB frames.

11. The method for fabricating a battery module according to claim 8, wherein the (c) step comprises mounting the cell leads on the busbars to horizontally arrange the battery cells.

12. The method for fabricating a battery module according to claim 8, wherein the step (e) comprises stacking the battery cells in a hinged manner.

13. A battery module, comprising:
units of battery cell—interconnect board (ICB) assembly—battery cell stacked in a heightwise direction from a ground, wherein in each unit, unidirectional battery cells having cell leads at one end are connected facing each other with respect to an ICB assembly such that the cell leads face each other,
wherein each ICB assembly includes an monolithic ICB frame in which the cell leads are received, and busbars formed in the ICB frame and electrically connected to the cell leads, and wherein each ICB frame has rod-shaped protrusions on respective sides thereof, the sides being separated along a lengthwise direction,
wherein adjacent ICB assemblies of the stacked ICB assemblies are connected with a joint element separate and distinct from the ICB frames having grooves into which the protrusions are inserted, respectively, for connecting two ICB frames arranged along the lengthwise direction, and
wherein the battery module further comprises an additional busbar for vertical series connection of the battery cells coupled to a side of the stacked ICB assemblies.

14. The battery module according to claim 13, wherein at least one of the battery cells includes bank unit cells stacked such that cell leads within the bank unit cells of same polarity are in contact with each other and connected in parallel.

15. The battery module according to claim 13, wherein two battery cells facing each other in one of the units are horizontally connected in series through the busbars formed in the respective ICB assembly.

16. The battery module according to claim 13, wherein the battery cells in one of the units include four battery cells connected to the respective ICB assembly, and two of the battery cells placed in upper and lower positions are vertically connected in series through the busbars formed in the respective ICB assembly.

17. The battery module according to claim 13, wherein the joint element is a hinge structure.

* * * * *